United States Patent
Chen et al.

(10) Patent No.: US 11,036,753 B2
(45) Date of Patent: Jun. 15, 2021

(54) CREATING MAPPING RULES FROM META DATA FOR DATA TRANSFORMATION UTILIZING VISUAL EDITING

(71) Applicant: International Business Machines Corporation, Armonk, NY (US)

(72) Inventors: Helen T. Chen, Oakland Gardens, NY (US); Thomas R. Maguire, Brewster, NY (US); John F. Schumacher, Lexington, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1453 days.

(21) Appl. No.: 14/306,940

(22) Filed: Jun. 17, 2014

(65) Prior Publication Data

US 2014/0310320 A1    Oct. 16, 2014

Related U.S. Application Data

(63) Continuation of application No. 09/722,526, filed on Nov. 28, 2000, now Pat. No. 8,788,931.

(51) Int. Cl.
*G06F 17/00* (2019.01)
*G06F 16/25* (2019.01)
*G06F 40/151* (2020.01)

(52) U.S. Cl.
CPC ............ *G06F 16/258* (2019.01); *G06F 17/00* (2013.01); *G06F 40/151* (2020.01)

(58) Field of Classification Search
CPC .... G06F 17/2247; G06F 16/258; G06F 17/00; G06F 40/151

(Continued)

(56) References Cited

U.S. PATENT DOCUMENTS 4,498,147 A    2/1985 Agnew et al.
4,503,516 A    3/1985 Agnew et al.

(Continued)

FOREIGN PATENT DOCUMENTS

JP    10116275 A    5/1998

OTHER PUBLICATIONS

Clark, J., "Xsl transformations (xslt)," [online] World Wide Web Consortium (W3C) © 1999, retrieved from the Internet: <http://www.w3.org/TR/xslt>, 98 pg.

(Continued)

*Primary Examiner* — Laurie A Ries
(74) *Attorney, Agent, or Firm* — Cuenot, Forsythe & Kim, LLC

(57) ABSTRACT

A visual editor creates the meta rules for transforming mapping data between the source meta data and target meta data representation via a wide variety of Graphical User Interface (GUI). A set of transformation rules or scripts is generated by the editor using a transformation rule engine, e.g. XSL and sent to a standard transformation engine, e.g. XSLT which accepts an input data file and using the transformation rules generates a transformed output data file The meta rules are represented in a template and stored in a configuration file. The configuration file can be updated with other rules by the visual editor specifying in the rule file the transformation/mapping language as an element of the rule file. The editor specifies any attributes or parameters on the rule transformation/mapping element. The transformation rule engine reads in a new meta rule generated by the editor. Parameter values are added to complete the rule based on the description from a meta rule configuration file. A locking mechanism in the template is selected to lock the context to the template or portion of the rule definition selected at the time the lock is clicked. The new transformation/rule is (Continued)

saved into the transformation rule file. An editor-mapping engine generates a notification of the creation of a new transformation-mapping rule; updates the meta data rules file; and provide the updated rule file to the transformation engine. Input data to the transformation engine is processed using the updated rule file and the transformed data is provided as an output.

20 Claims, 28 Drawing Sheets

(58) Field of Classification Search
USPC .......................................................... 715/523
See application file for complete search history.

(56) References Cited

U.S. PATENT DOCUMENTS

| | | |
|---|---|---|
| 5,251,314 A | 10/1993 | Williams |
| 5,513,323 A | 4/1996 | Williams et al. |
| 5,915,259 A | 6/1999 | Murata |
| 5,920,879 A | 7/1999 | Kyojima et al. |
| 6,061,696 A | 5/2000 | Lee et al. |
| 6,202,072 B1 | 3/2001 | Kuwahara |
| 6,694,338 B1 | 2/2004 | Lindsay |
| 2002/0026359 A1 | 2/2002 | Long et al. |
| 2002/0161777 A1 | 10/2002 | Smialek |
| 2002/0199034 A1 | 12/2002 | Beckett et al. |

OTHER PUBLICATIONS

Brown, B., "Introduction to AWK, Part 1 of 3," [retrieved Nov. 3, 2000] retrieved from the Internet: <http://laImport.rhon.itam.mx/dcomp/awk.html>, 38 pg.

"XMLSPY features," [online] Altova GmbH © 2000 [retrieved May 31, 2004], retrieved from the Internet: <http://web.archive.org/web/20001121110200/www.xmlspy.com/features_intro.html>, 61 pg.

"Direct Mail Now E-Commerce System," U.S. Appl. No. 60/183,921, Feb. 22, 2000, 122 pg.

Data Junction Corporation, © 2000 [retrieved Jun. 16, 2014] from the Internet: <http://web.archive.org/web/20000816043033/http://www.datajunction.com/>, 1 pg.

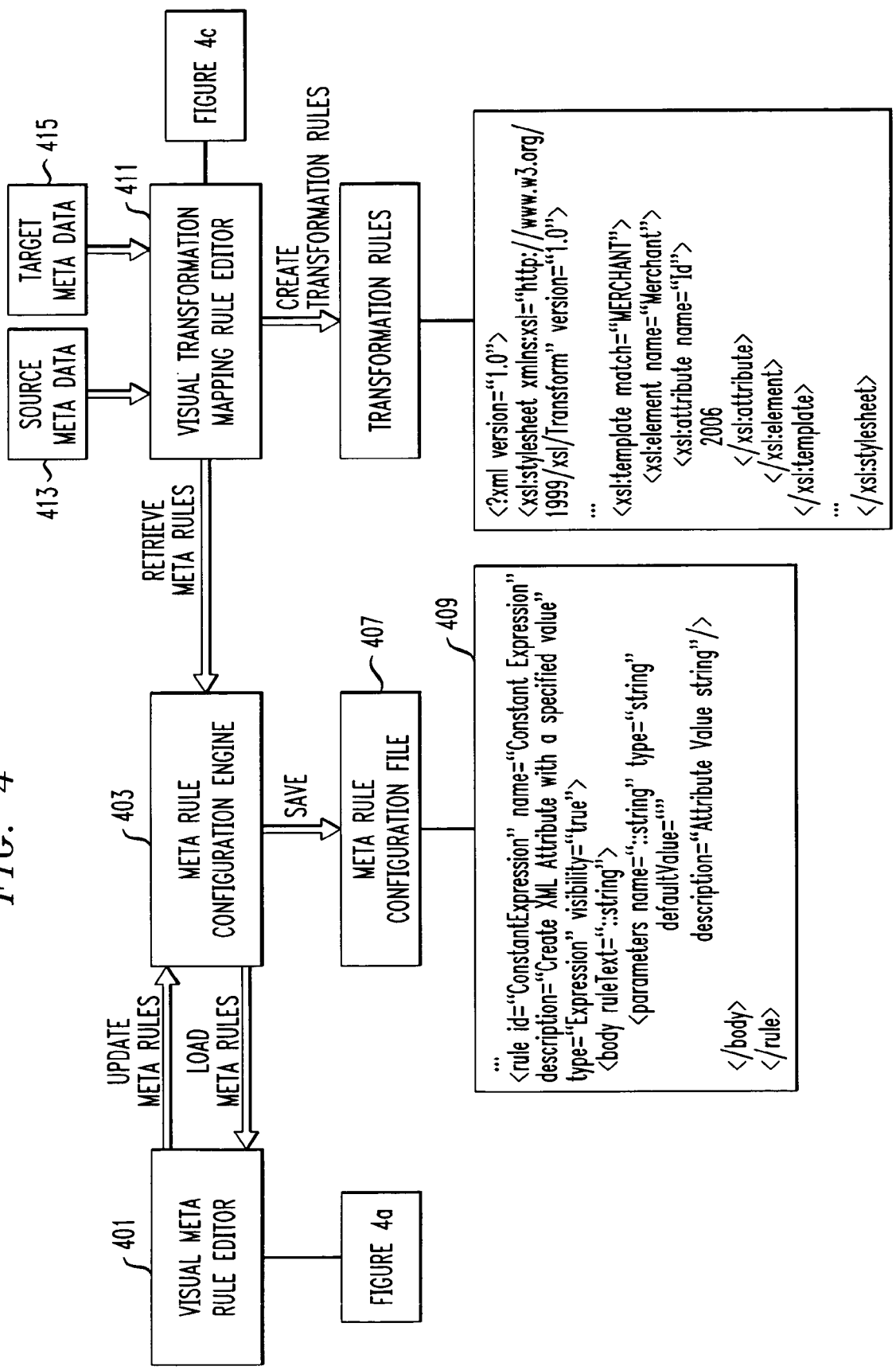

VISUAL TRANSFORMATION MAPPING RULE EDITOR SCREEN

FIG. 4h

Mapping Rule

📁 f:\templ\sample.xsl      🗐 Current Template

| # Mapped | Name | Value Expression |
|---|---|---|
| | </> Base | |
| 1 | ⊟·<l> Template: (PRODUCT) | |
| 1 |   ⊟·<e> Element (Product) | |
| 1 |     <a> Attribute (ID) | <xsl:apply-templates select="@PRNBR" /> |
| 1 | ⊟·<l> Template: (PRODUCT_PRICE) | |
| 1 |   ⊟·<e> Element (Product) | |
| |     <a> Attribute (Currency) | <xsl:apply-templates select="@CURR" /> |

Mapping Information | Generated XSL Rules

Mapping Rule

📁 f:\temp\sample.xsl　　　🗐 Current Template CATEGORY

```
<xsl:template match="CATEGORY">

<xsl:element name="CATEGORY">
    <xsl:attribute name="CGNBR"><xsl:apply-templates select="@CGNBR"/></x
    <xsl:attribute name="CGDISPLAY">1</xsl:attribute>
  </xsl:element>

</xsl:template>
```

NEWLY GENERATED XSL MAPPING RULE

⎬ 425

| Mapping Information | Generated XSL Rules |

FIG. 5f

PSEUDO CODE:

```
When drag and drop event happens{
    Identify the source information;
    Identify the target information;
    Identify the XSL Template (existing Rule base);
    Identify the mapping relationship{
        Element-Element or
        Attribute-Attribute or
        Element-Attribute or
        Attribute-Element
    }
    Identify the Meta Rule for the mapping relationship;
    Apply source and target information into the Meta Rule parameters;
    If (some parameters information missing){
        Prompt for user input;
        Apply user input into Meta Rule parameters;
    }
    Create new Mapping Rule from the Meta Rule information gathered;
    Save Mapping Rule into Transformation Mapping Rule engine Data Structure;
    Generate the new XSL Rule from Mapping Rule information;
    Save XSL Rule into the XSL File;
}
```

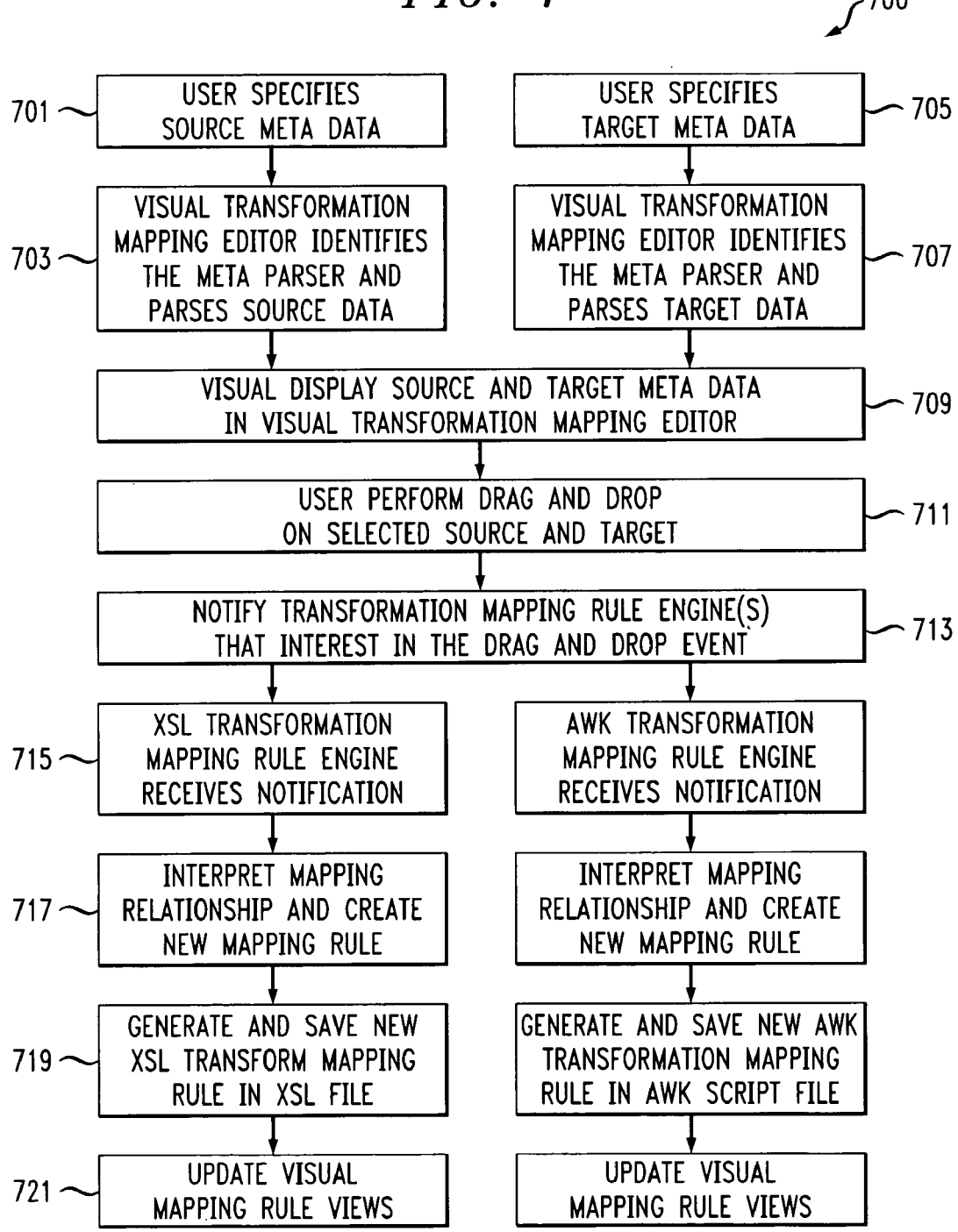

FIG. 8

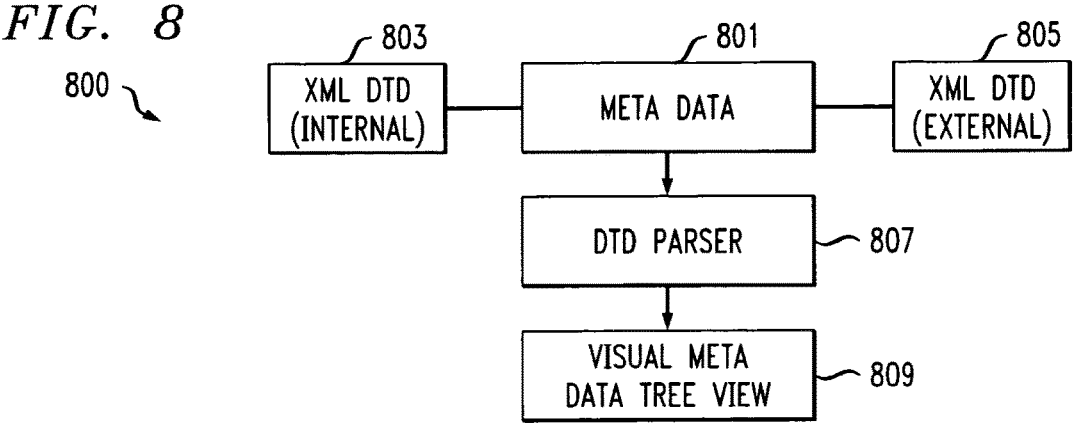

FIG. 8a

PSEUDO CODE:

```
For each Meta Data file, identify the Meta Data file type{
    if (MetaData file is external XML DTD file){
        Use DTDParser to get all DTD info and build a parent-child
        relationship tree;
    }
    if (MetaData file is internal XML DTD file){
        Use DTDParser to get only DTD info and build a parent-child
        relationship tree;
    }
    if (other MetaData file type){
        Use other MetaDataParser, get Meta Data and build a parent-child
        relationship tree;
        ...
    }

While (parent-child relationship Tree has more DTD elements){
        Add element to Visual tree object;
        Set and show visual icon to indicate a DTD Element (with or
        without children/attributes)
        While (DTD element has more attribute){
            Add attribute to Visual tree for current DTD element;
            Set and show visual icon to indicate an Attribute;
        }
        While (DTD element has more child DTD element){
            Add child to Visual tree for current DTD element;
            Set and show visual icon to indicate a DTD Element
            (with or without children/attributes)
        }
    }
}
```

FIG. 9

```
C:\TEMP\sample.dtd

<!ELEMENT WCS41 (( MERCHANT | CATERGORY | PRODUCT )*)>
<!ELEMENT MERCHANT (CATEGORY)>
<!ATTLIST MERCHANT
    MERFNBR         CDATA       #REQUIRED
    MENAME          CDATA       #IMPLIED
    MECLNAM         CDATA       #REQUIRED
    MECFNAM         CDATA       #REQUIRED
                         905
>
<!ELEMENT CATEGORY (PRODUCT)>
<!ATTLIST CATEGORY
    CGDISPLAY       CDATA       #IMPLIED
    CGOID           CDATA       #IMPLIED
    CGNBR           CDATA       #IMPLIED
>
<!ELEMENT PRODUCT EMPTY>
<!ATTLIST PRODUCT
    PRDFIELD1       CDATA       #IMPLIED
    PRFIELD2        CDATA       #IMPLIED
    PRFIELD3        CDATA       #IMPLIED
>
```

Tree View | Text View

```
C:\TEMP\sample.dtd

</> WCS41
├─ <el> MERCHANT
│      <at> MECFNAM
│      <at> MECLNAM
│      <at> MENAME
│      <at> MERFNBR
│      <el> CATEGORY              903
│           <at> CGDISPLAY
│           <at> CGNBR
│           <at> CGOID
│           <el> PRODUCT
│                <at> PRFIELD1
│                <at> PRFIELD2
│                <at> PRFIELD3
├─ <el> CATEGORY
└─ <el> PRODUCT
```

Tree View | Text View

PSEUDO CODE:

```
When Mapping Rule change event happens {
   if(Create Mapping Rule) {
      Create new Mapping rule with information provided;
      Add new Mapping Rule to Mapping Rule Data Structure List;
   }
   else if(Modify or Delete Mapping Rule) {
      find existing Mapping Rule;
      if(Modified) {
         Change Mapping Rule value(s);
      }
      else if(Delete) {
         Delete the Mapping Rule found;
      }
      Update the Mapping rule in the Mapping Rule Data Structure List;
   }
   Save Mapping Rule Data Structure list information to persist data file;
   Generate new XSL Rules from the new/updated Mapping Rule;
   Save new XSL Rules to the XSL Rule file;
   Update both Mapping rule table and Generated XSL Rule view for changed rule(s);
}
```

Figure 13. Pseudo Code:

{when lock Template happens}
Set locked Template = selected Template;

CREATING MAPPING RULES FROM META DATA FOR DATA TRANSFORMATION UTILIZING VISUAL EDITING

CROSS-REFERENCE TO RELATED APPLICATIONS

This application is a Continuation of U.S. application Ser. No. 09/722,526, filed on Nov. 28, 2000.

BACKGROUND OF THE INVENTION

Field of Invention

This invention relates to data transformations from a first format and syntax to a second format and syntax. More particularly, the invention relates to methods, systems and program products creating mapping rules from meta data for data transformations utilizing visual editing.

Description of Prior Art

Data within enterprises is stored and managed in many different formats. Companies continually need to integrate different systems within an enterprise or across enterprises. Often these integrations require that the data in different systems be transformed or remapped so that it is compatible with the expected mapping and format of the data in other systems. Many data transformation and mapping tools exist in the market already. However, these tools are generally designed to describe how to map existing data to another data format, and not across a series of data formats.

What is needed in the data transformation art is a technique for generating transformation rules and scripts which can be applied to many different sets of data. A preferred technique would utilize visual editing of the transformation rules using the description of the data format and semantic or meta data in lieu of the actual data. Visual editing provides a user with the ability to visualize the difference between the element and sub-element of the meta definition of the data being mapped. meta data describes how and when and by whom a particular set of data was collected and how the data is formatted. meta descriptions are often easier to create than a sampling of the actual data. Transformations based off actual data may be inaccurate to the complete set of data that may be input to the system. When working directly off actual data, the transformation generated may be too generic or specific because of the context of the sample data that was utilized in order to create the transformation. If there is improper data for the set of transformations and mapping, the meta data can describe the erroneous data and the transformation process and rules can throw out this data or warn the user that the data is inappropriate. Moreover, data does not necessarily easily represent the semantics or context of the data to the user creating the transformation or mapping. This is generally better described in meta data rather than in the actual data. For example, an Extended Markup Language-Document Type Definition (XML DTD) that has a PRODUCT element with an attribute called DESCRIPTION, will generally provide good information to the operational person creating the mapping what the data represents. However, the actual description data being seen in the transformation visualization tool will not necessarily make it obvious to the operation person that the information is a description. Finally, a transformation over a meta description is reusable across a wide set of data that conforms to the meta information description and will generally be more robust than one produced from some sub-sampling of data.

Prior art related to data transformation includes:

U.S. Pat. No. 4,503,516 issued Mar. 5, 1985, discloses a method of transforming a first editable form of a document prepared by an interactive text processing system into a second and incompatible editable form for use in another interactive or batch text processing system through the use of a transform mechanism is described. A significant step of this method requires the identification of a limited number of key state variables, whose values collectively identify the necessary state information for transforming the first document form to the second. After the key state variables have been identified, the actual number of combinations thereof is determined. For each first document form input item encountered by the transform mechanism, and for each combination of key state variables in which that input item can be encountered, one or more output items for the second document form is explicitly defined as the transform thereof. In addition, the state of the transform mechanism after each such transform has occurred, must also be specified. The described method is also to resolve the actual state that exists at the start of each document. It is also adapted to handle sub-documents, such as margin text, existing within a document to be transformed.

U.S. Pat. No. 5,251,314 issued Oct. 5, 1993, discloses a transform information object created for each object within a data processing system. An indication of each document type which has been created as a result of a transformation of that document and an identification of the application which can perform the transformation are then stored within the transform information object along with an indication of selected entities within the document which were not transformable by the application. Subsequent attempts at a transformation of the document may then be efficiently performed by a reference to the transform information object and the utilization of the information stored therein. In one embodiment of the present invention the transform application name, address location within the data processing system and capability description are stored within the transform information object.

Data Junction, described at http://www.datajunction.com, discloses an engine that connects to data in its native environment and performs transformations in memory. The engine is complemented by a GUI that enables the visual creation of complex transformation routines. A Metadata Query utility allows users to run queries against a Data Junction Metadata Repository.

None of the prior art discloses visual transformation rule GUIs utilizing meta data to create transformations mappings which do not work off data and visually represent the form of the expected data by dragging and dropping elements between an input form and output form without the need for any sampled data.

SUMMARY OF THE INVENTION

Data transformations based on meta descriptions of data format and semantics, rather than on output data, enable meta rules to be created for the data transformations in a visual-editing environment. Based on a visual representation or mapping of the source and target meta data descriptions, a visual editor creates the meta rules for transforming mapping data between the source meta data and target meta data representation via a wide variety of Graphical User Interface (GUI) techniques including, but not limited to, dragging and dropping, visual graphical rule editing and manual syntax-prompted textual entry. A set of transformation rules or scripts is generated by the editor using a transformation rule engine, e.g. Extended Style Language (XSL) and sent to a standard transformation engine, e.g. XSLT which accepts an input data file and using the transformation rules generates a transformed output data file. The meta rules are stored in a configuration file. The configuration file can be updated with other rules by the visual editor specifying in the rule file the transformation/mapping language as an element of the rule file. The editor specifies any attributes or parameters on the rule transformation/mapping element. Default values and a wide variety of other descriptions and specifics may be created based on the syntax of a particular transformation language. The transformation rule engine reads in a new meta rule generated by the editor. Parameter values are added to complete the rule based on the description from a meta rule configuration file. The new transformation/rule is saved into the transformation rule file. In operation, source and target data are converted from a flat file into a tree to represent the flat structure of a Document Type Definition (DTD) or schema. The tree is visualized on a screen for editing purposes. Meta mapping rules are generated by the editor and displayed in a template. The mapping rule is visually added to the tree by an editor. The mapping rule is added by a drag and drop process from source schema to target schema. The source schema node gets dragged into the target schema, which creates a transformation-mapping rule for a template. The rule context can be locked to the template prior to the drag and drop, and unlocked when a user no longer wants to have the same template as the context to create new 7=10 transformation mapping rule during drag and drop process. An editor-mapping engine generates a notification of the creation of a new transformation-mapping rule; updates the meta data rules file; and provide the updated rule file to the transformation engine. Input data to the transformation engine is processed using the updated rule file and the transformed data is provided as an output.

DESCRIPTION OF THE DRAWINGS

The invention will be further understood from the following detailed description of the preferred embodiment taken in conjunction with an appended drawing, in which:

FIG. 4 is a flow diagram for updating transformation rules in the system of FIG. 1.

FIG. 4h is a visual template describing a mapping rule in the flow diagram of FIG. 4.

FIG. 4i is a text representation of the template of FIG. 4h.

FIG. 5f is a listing of pseudo code for creating the new mapping rule.

FIG. 7 is a flow diagram for creating mapping rules in the system of FIG. 6.

FIG. 8 is a flow diagram for creating visual meta data in a tree view.

FIG. 8a is a listing of pseudo code for creating the meta data in tree form in FIG. 8.

FIG. 9 is meta data displayed in a tree and in text format.

FIG. 10a is a listing of pseudo code for implementing the mapping rule change in FIG. 10.

DESCRIPTION OF THE PREFERRED EMBODIMENT

Figure 1:
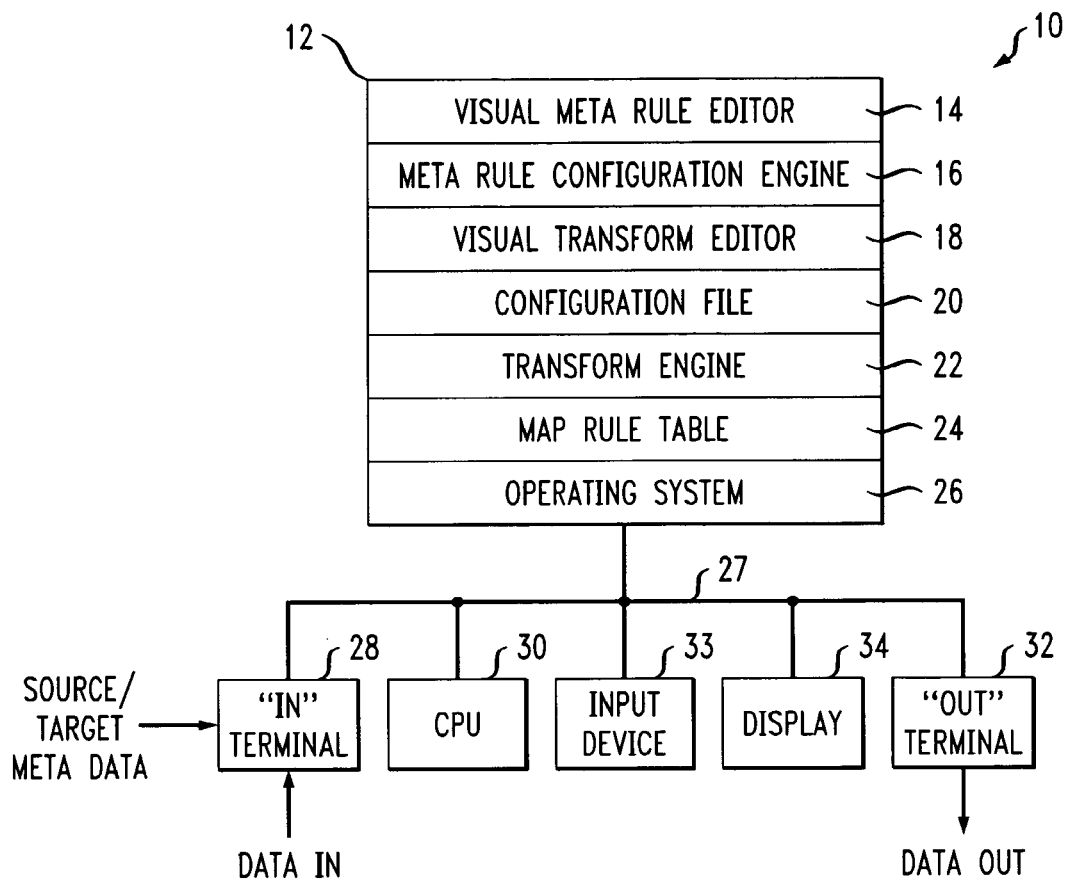
FIG. 1 is a representation of a computer system for creating mapping rules from meta data for data transformation utilizing visual editing and incorporating the principles of the present invention.

In FIG. 1, a computer system 10 creates mapping rules from meta data for data transformation utilizing visual editing. The system comprises a memory 12 including software stored for implementing document transformations. A visual meta rule editor 14 enables the generation of meta rules for transformation purposes. A meta rule configuration engine 16 generates a new meta rule from the changes made by the editor program 14. A visual transformation mapping rule editor 18 visualizes the mapping rule for the editor. A meta rule configuration file 20 stores the meta rules. A transformation engine 22 implements the meta rules in transforming input data in one format and syntax to an output data of another format and syntax. A mapping rule table 24 stores templates of mapping rules. An operating system 26 manages the computer system. The memory is connected through a buss 26 to an input terminal 28 for receiving data in one format and syntax, e.g., DTD, XML, and source/target meta data descriptive of the input and output data for processing by a CPU 30 using the software in the memory 12. An output terminal 32 provides output data in another format and syntax. A display 34 enables an editor to display source meta data representative of input data and target meta data representative of desired output data. An input device 35, typically a pointer device is connected to the buss for use by a user or editor or human operator (all not shown) for document editing purposes. The editor using the software in the memory 12 can create new meta rules and add them to the target schema and generate a new transformation rule for transforming the input data to the output data using a transformation engine, as will be described in more detail hereinafter.

Figure 2:
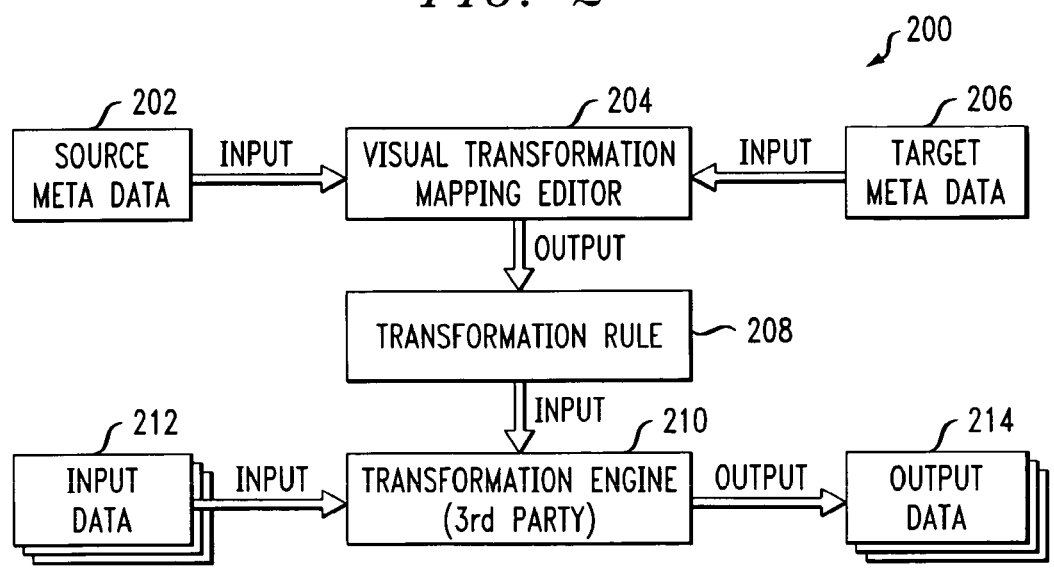
FIG. 2 is a flow diagram for creating transformation rules in a generic format and syntax in the system of FIG. 1.

In FIG. 2, a process 200 implements the transformation of data in one format and syntax to a second data format and syntax. In block 202, a source or input meta data description is provided to a visual transformation-mapping editor in block 204. A target or output meta data description in block 206 is also provided to the block 204. Block 204 brings up a visual representation or map of the source and target meta data descriptions on a display. A visual editor, as will be described in more detail hereinafter, creates rules for transforming or mapping data between the input and output meta data representations via a wide variety of visual Graphical User Interface (GUI) techniques including, but not limited to, dragging and dropping, visual graphical rule editing, and manual syntax-prompted textual entry. The output of block 204 is sent to a set of transformation rules or scripts in block 208 that can be sent to a transformation engine in block 210. The transformation engine accepts an input data file in block 212 and applies the transformation rules to generate an output data file 214 which has been transformed from the input data file.

Figure 3:
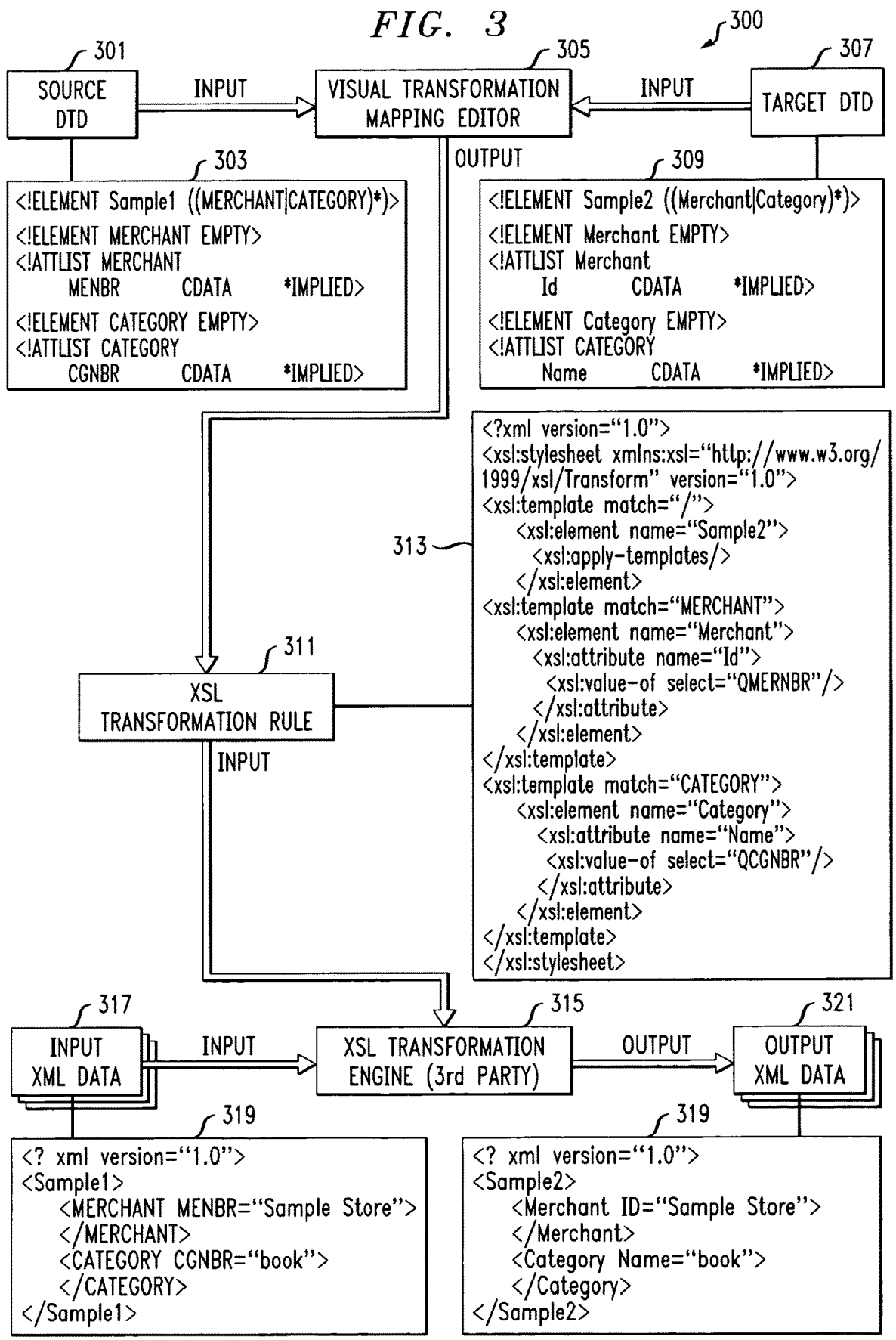
FIG. 3 is a flow diagram for creating transformation rules in an XSL format for XML transformations in the system of FIG. 1.
Figure 4A:
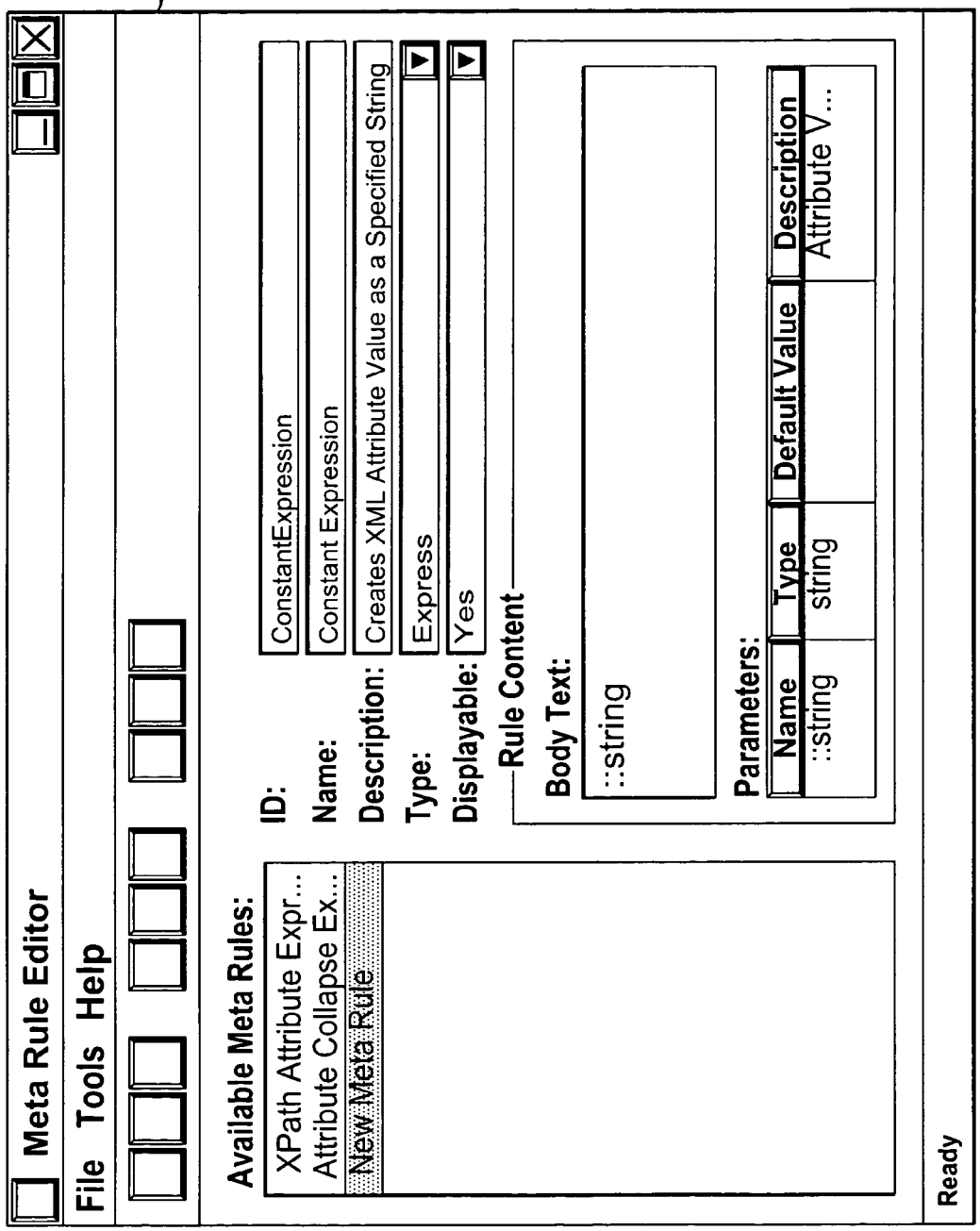
FIG. 4a is a visual meta rule editor screen in the flow diagram of FIG. 4.
Figure 4B:
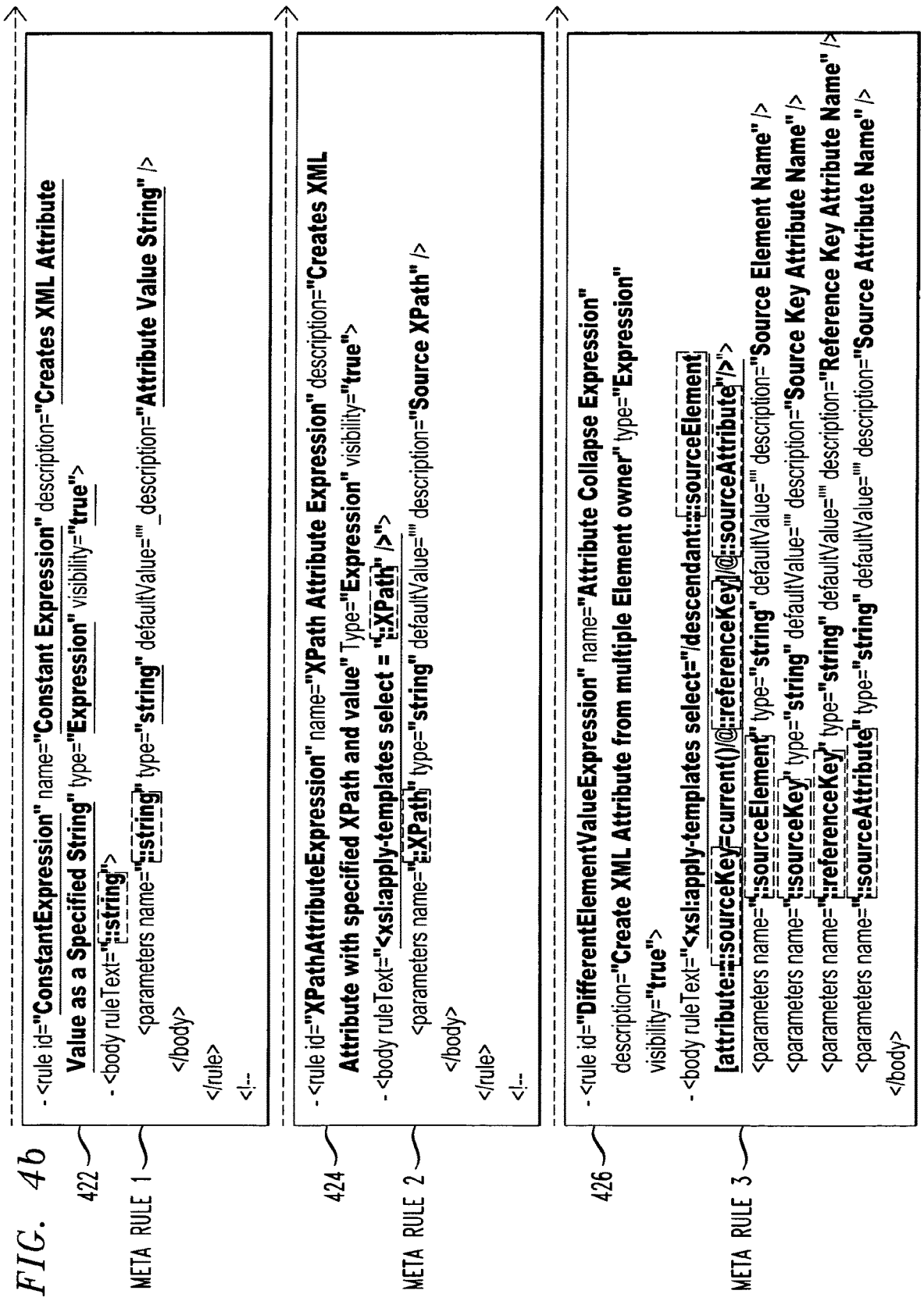
FIG. 4b is a representation of three (3) meta rules for display to and selection by an editor in a transformation in the flow diagram of FIG. 4.
Figure 4C:
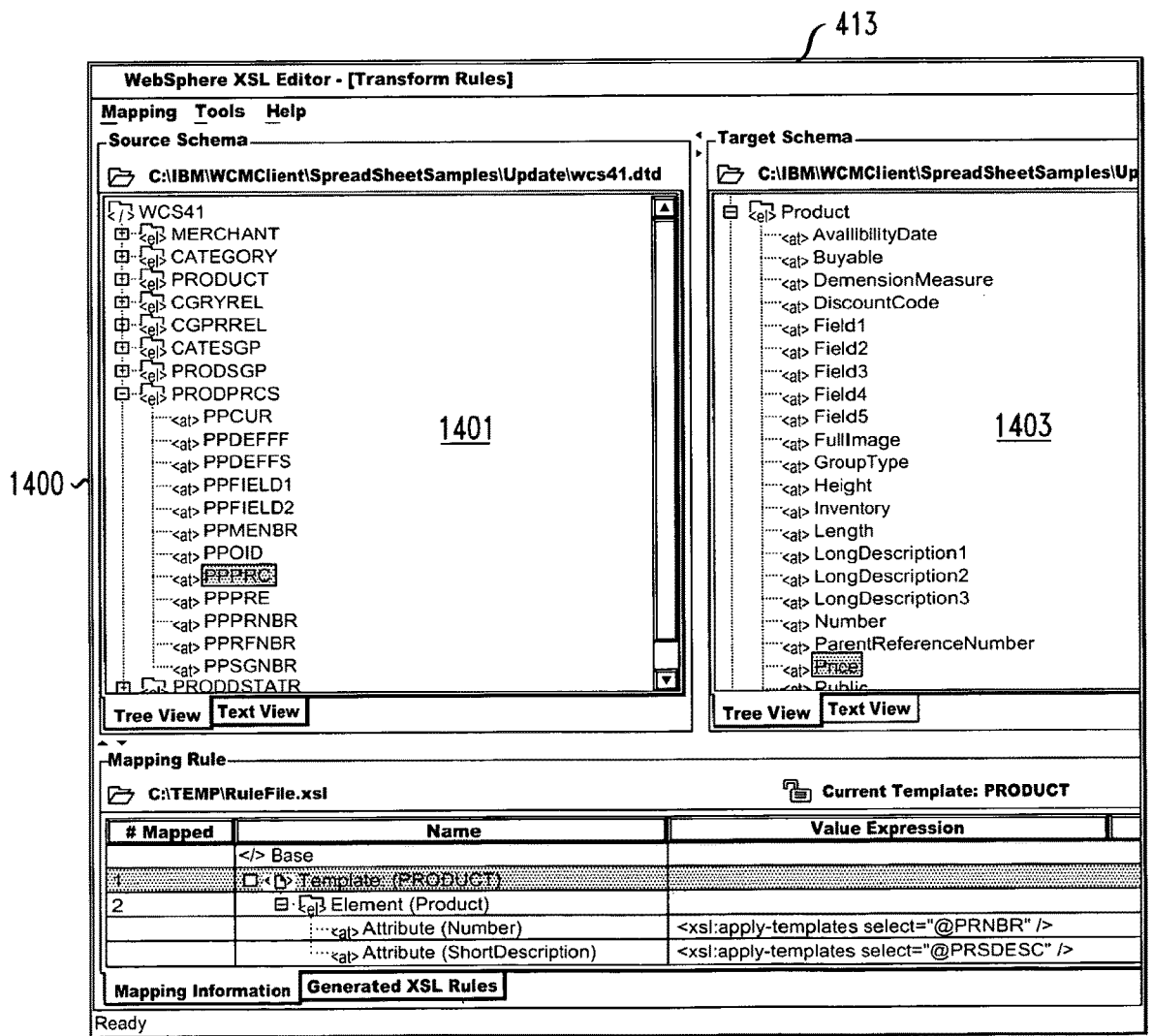
FIG. 4c is a visual transformation mapping rule editor screen for adding a new rule to a transformation engine in the flow diagram of FIG. 4.
Figure 4D:
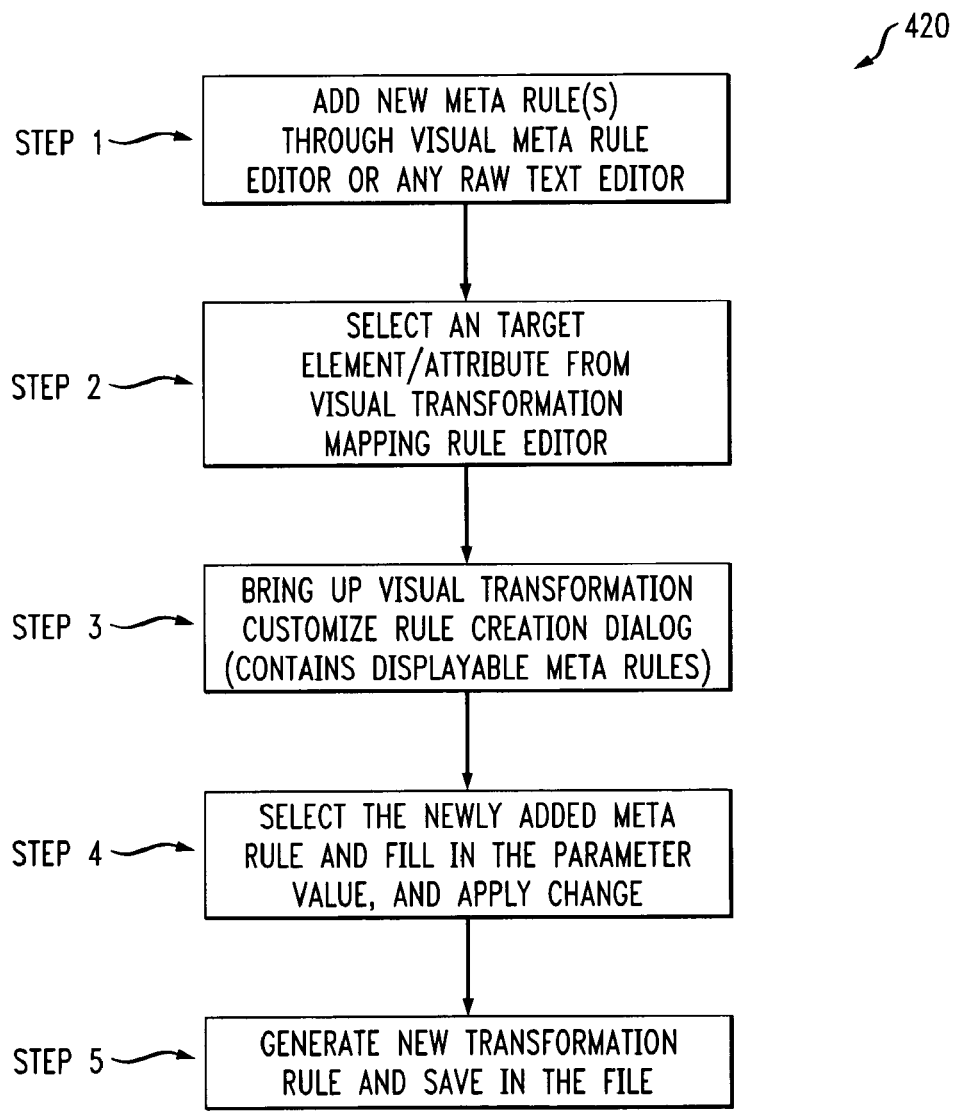
FIG. 4d is a flow diagram for generating a new transformation rule.
Figure 4E:
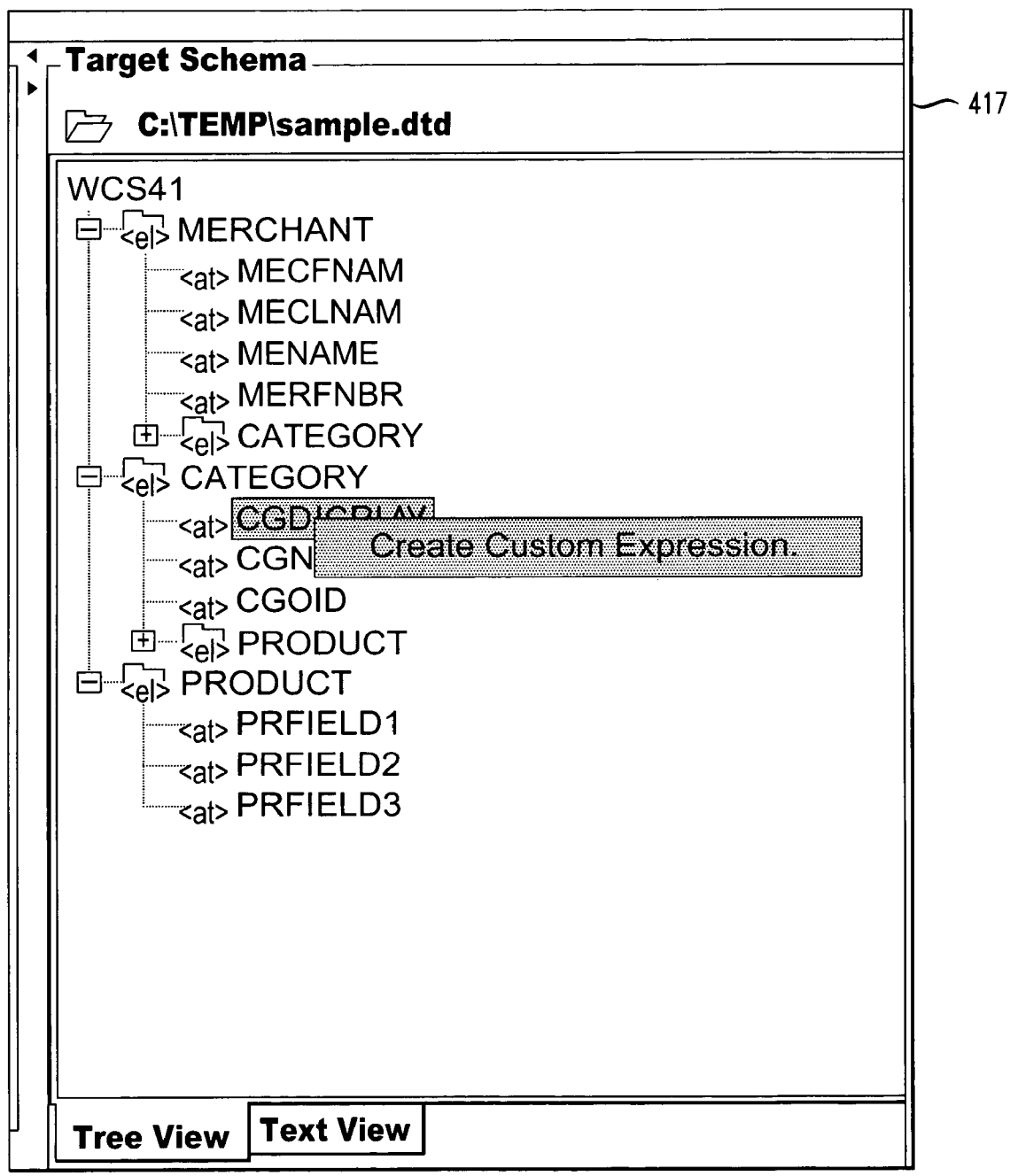
FIG. 4e is a visual screen of a target schema in the flow diagram of FIG. 4.
Figure 4F:
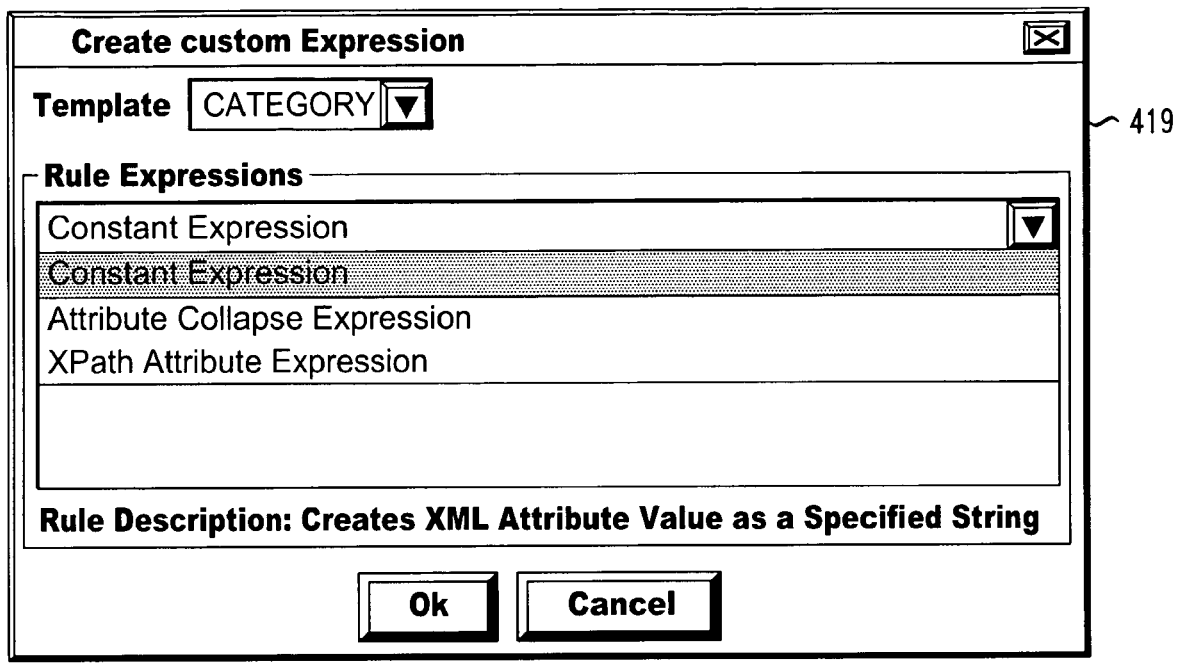
FIG. 4f is a dialog box for selection of a meta rule by an editor in the flow diagram of FIG. 4.
Figure 4G:
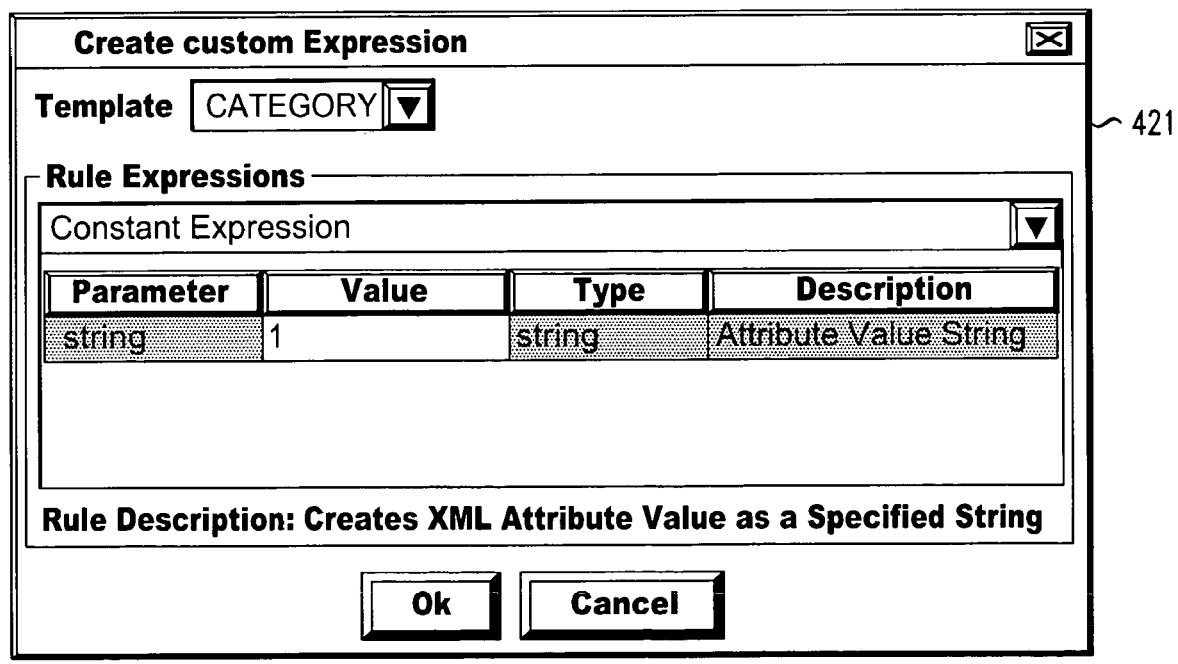
FIG. 4g is a dialog for entry of meta rule parameters by an editor in the flow diagram of FIG. 4.

In FIG. 3, a process 300 is a more specific example of FIG. 2 and the transformation of XML data between two different syntaxes or forms of XML. In block 301, a source Document Type Definition (DTD) file defines how XML data should be interpreted by a transformation engine. A representative description is shown in block 303. The Source DTD content contains a well form DTD that has a Sample element, the root, which has two child elements: MERCHANT element with one Attribute MENBR, and CATEGORY element with one Attribute CGNBR. The XML transformation rule content contains a well form XSL document that has a set of mapping rule to describe the data transformation from source to Target. In block 305, a transformation-mapping editor receives the source DTD and a target DTD in block 307. The target DTD is described in block 309. The target DTD content contains a well form DTD that has a Sample2 element, the root, which has two child elements: Merchant element with one Attribute Id, and Category with one Attribute name. An editor opens a meta rule configuration file via a text editor or via a visual rule-editing tool. The editor specifies in the rule file the transformation/mapping language verb for modification. The editor further specifies any attributes or parameters on the rule transformation/mapping verb. Default values in a wide variety of other descriptions and specifics may be added based on the syntax of a particular transformation language. These additional transformation rules or verbs are processed as needed to transform the input data to output data. Once completed, the transformation rule configuration engine in block 311 reads in the meta rule configuration file described in block 313. It provides an input to a transformation engine in block 315 which processes the XML input data in block 317. The Input XML Data content contains a well form XML data conforms the Source DTD, as shown in block 319 to obtain the transform XML output data in block 321. The output XML Data content contains a well form XML data conforms the Target DTD, as shown in block 323.

FIG. 4 provides additional details on generating meta rules for use in the process 300. A visual meta rule editor is loaded with meta rules by a meta rule configuration engine operating on a meta rule configuration file 405. A representative meta rule is shown in block 407. The editor 401 using a visual meta rule editor screen 405 as shown in FIG. 4(a), creates a new meta rule named "constant expression" 422 to complement available meta rules "X Path Attribute Expression" 424 and "Attribute Collapse Expression" 426. The new meta rule Constant Expression creates XML attribute value as a specified string and the rule content in terms of body text and parameters are entered in the screen by the editor. The text forms of the meta rules are shown in FIG. 4(b). For each meta rule, there is rule id, name, description, type and visibility attribute associate with it. Rule id and type attribute is used by the Meta Rule Configuration Engine to determine which meta rule to use. Visibility attribute is used by the Meta Rule Configuration to determine which meta rule to display to the user. Name and description attributes are to be display to the user to identify the rule and understand the usage of the rule. In addition, each meta rule has a rule body element. The rule contains a rule text attribute and Parameters element. The rule body is where the user would describe the XSL rule syntax in rule text attribute value field. The rule text attribute value may contain parameter(s). The parameter element has name, type, defaultValue, and description attribute associate with it. The parameter type identifies what is the type of the input parameter. The parameter description is display to the user to describe the use of this parameter. The parameter name is to identify which parameter in the rule body text to be replace by the parameter defaultValue when a new transformation-mapping rule is created. The parameter defaultValue can be specified either in the meta rule as default or from user input from the "Create Custom Expression" Dialog (FIG. 4e.).

The new updated meta rule is returned to the configuration engine 403 for storage in a new configuration file 407 described in block 409. The visual transformation mapping rule editor receives source meta data 413 and target meta data 414 and retrieves the meta rules from the configuration file 407 via the configuration engine 403. Using a visual transformation mapping rule editor screen 413 which displays the source schema and target schema in a tree-like fashion in a new rule 415 shown in a template by name, attributes, and value expression, the editor proceeds to generate a new transformation rule using a process 420 shown in FIG. 4(d).

In step 1, a new meta rule is created through the visual meta rule editor 401 (see FIG. 4). In step 2, the visual transformation mapping rule editor selects a target schema 417 to work on as shown in FIG. 4(e). In this case, the editor has selected a "Create Custom Expression" and in step 3 brings up a dialog box 419 shown in FIG. 4. The rule expression is selected in step 4 using dialog box 419, after which in step the parameter values for the new rule are added in dialog box 421 shown in FIG. 4(g). A new transformation rule is generated in step 5 and described in a template 423 shown in FIG. 4(h). New rule in textual format 425 is shown in FIG. 4(i).

Figure 5:
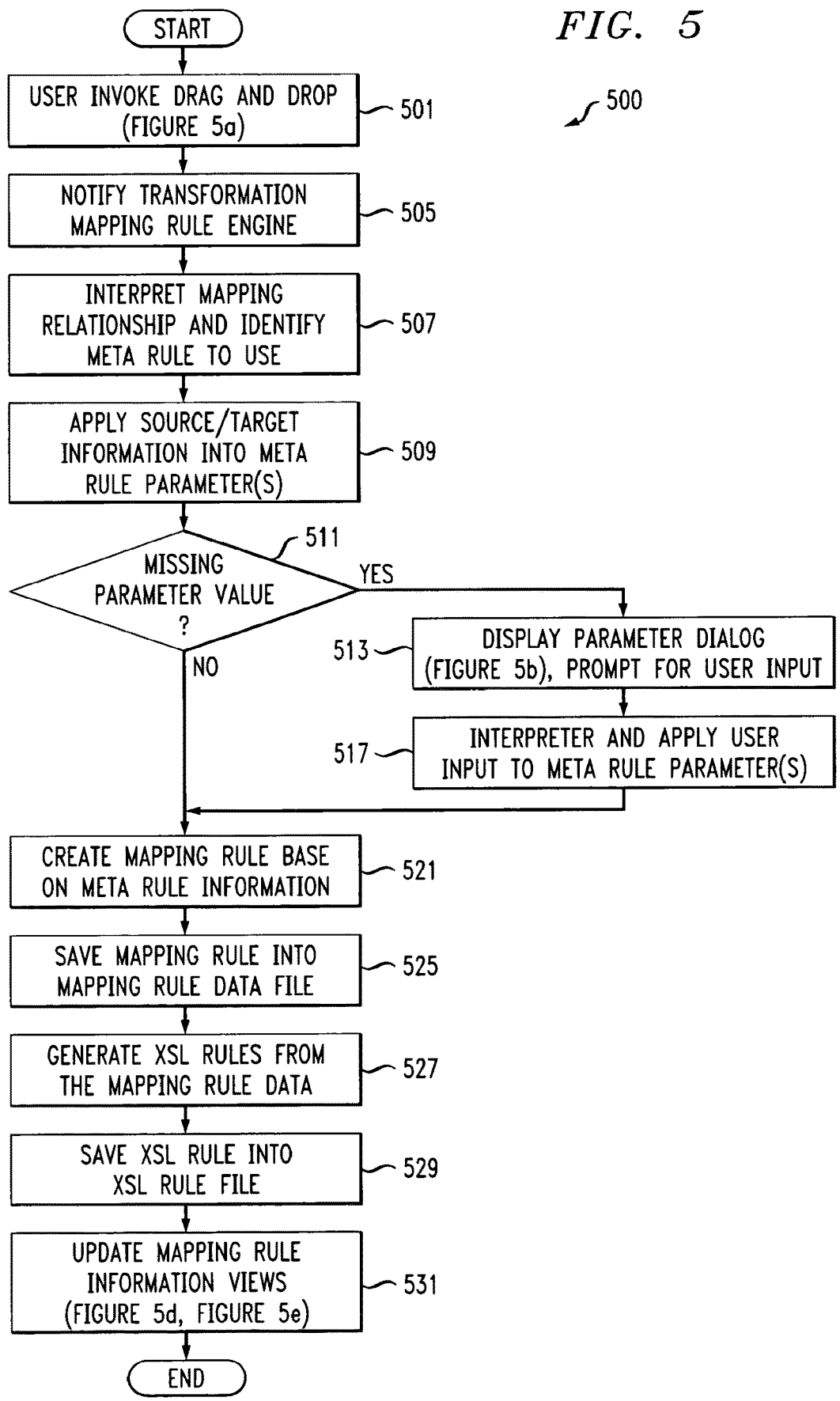
FIG. 5 is a flow diagram of the process of FIGS. 4-4i.
Figure 5A:
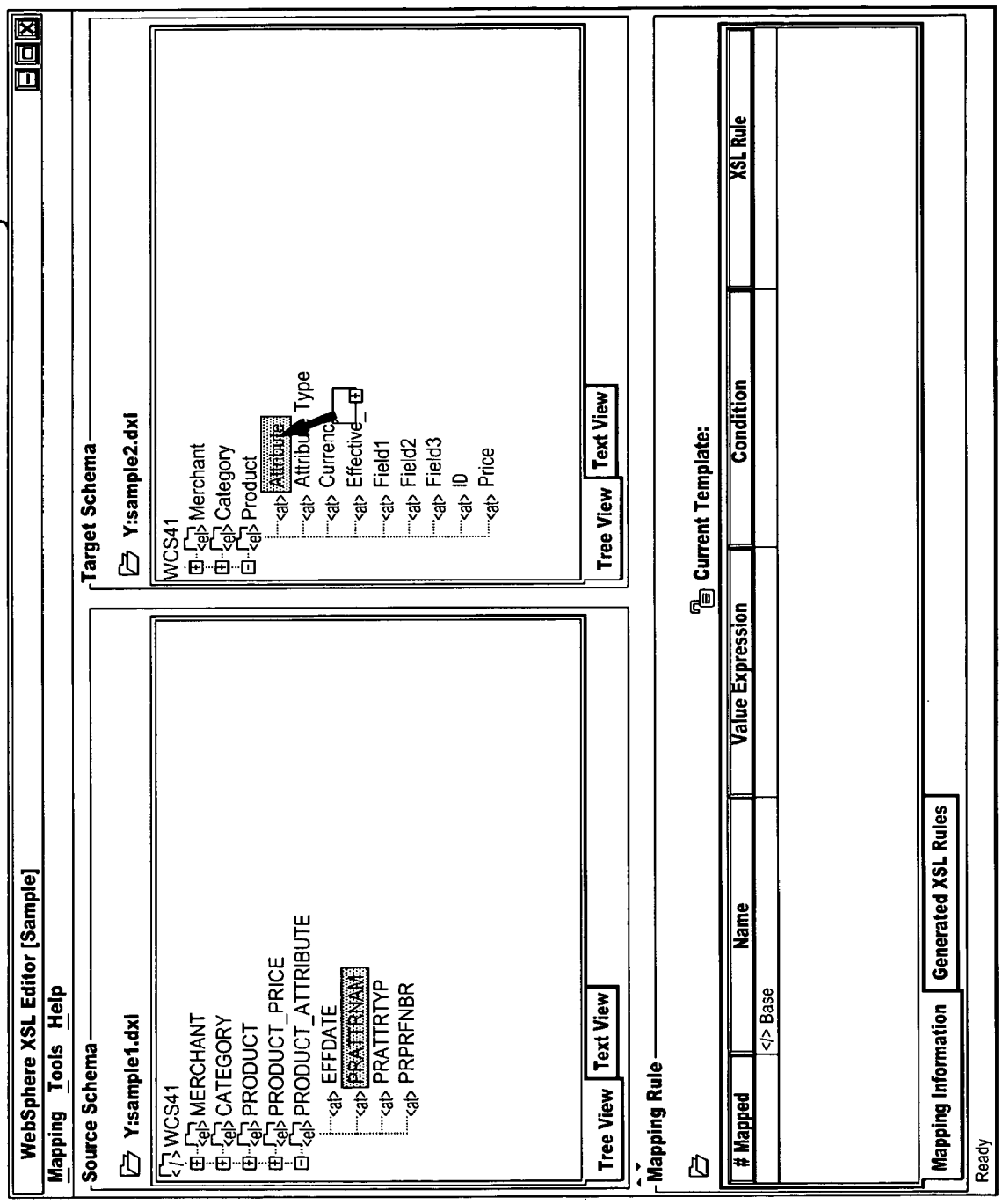
FIG. 5a is a visual screen displaying a source schema and a target schema in a "tree" form.
Figure 5B:
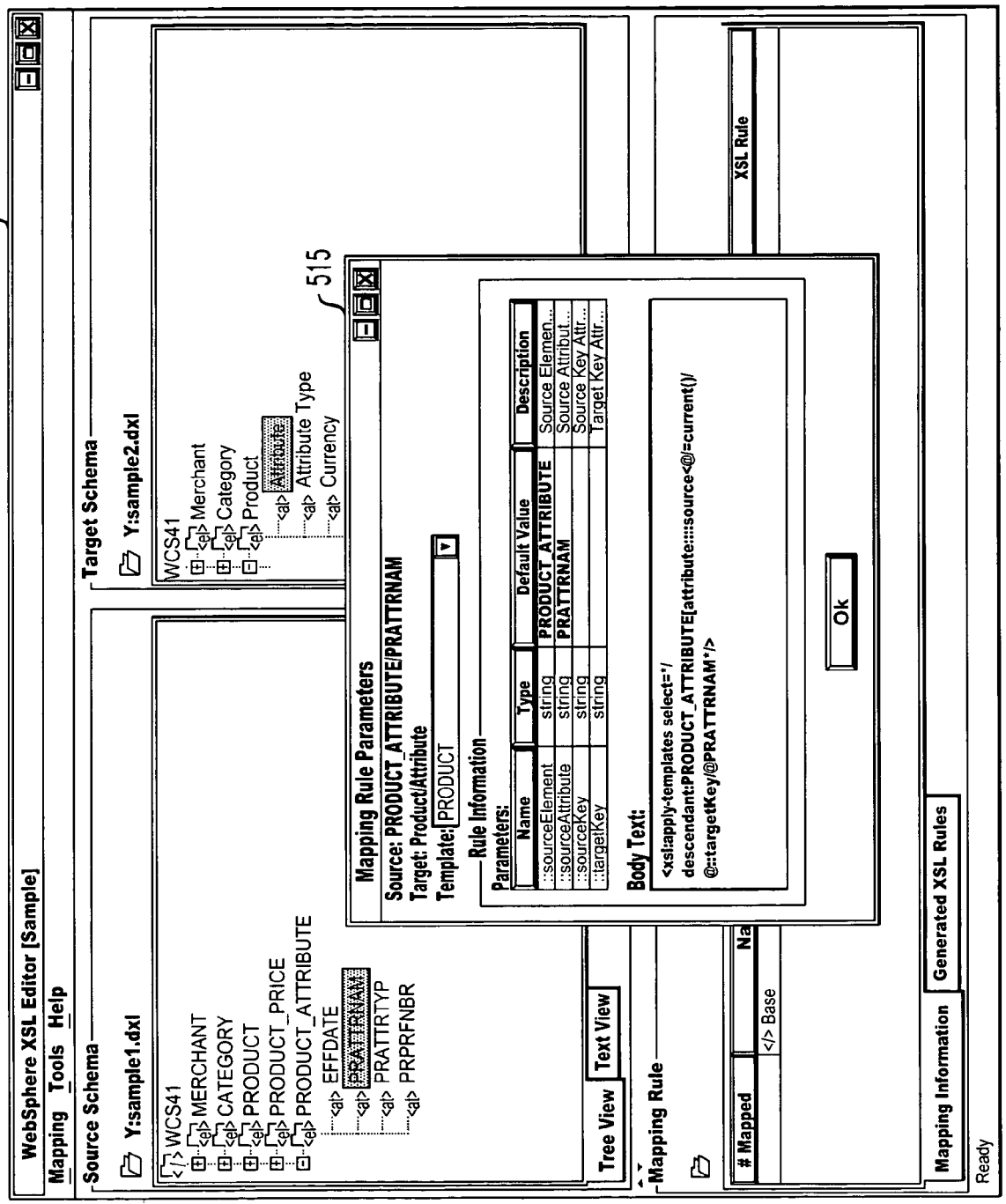
FIG. 5b is a dialog box in the screen of FIG. 5a for adding mapping rule parameters.
Figure 5C:
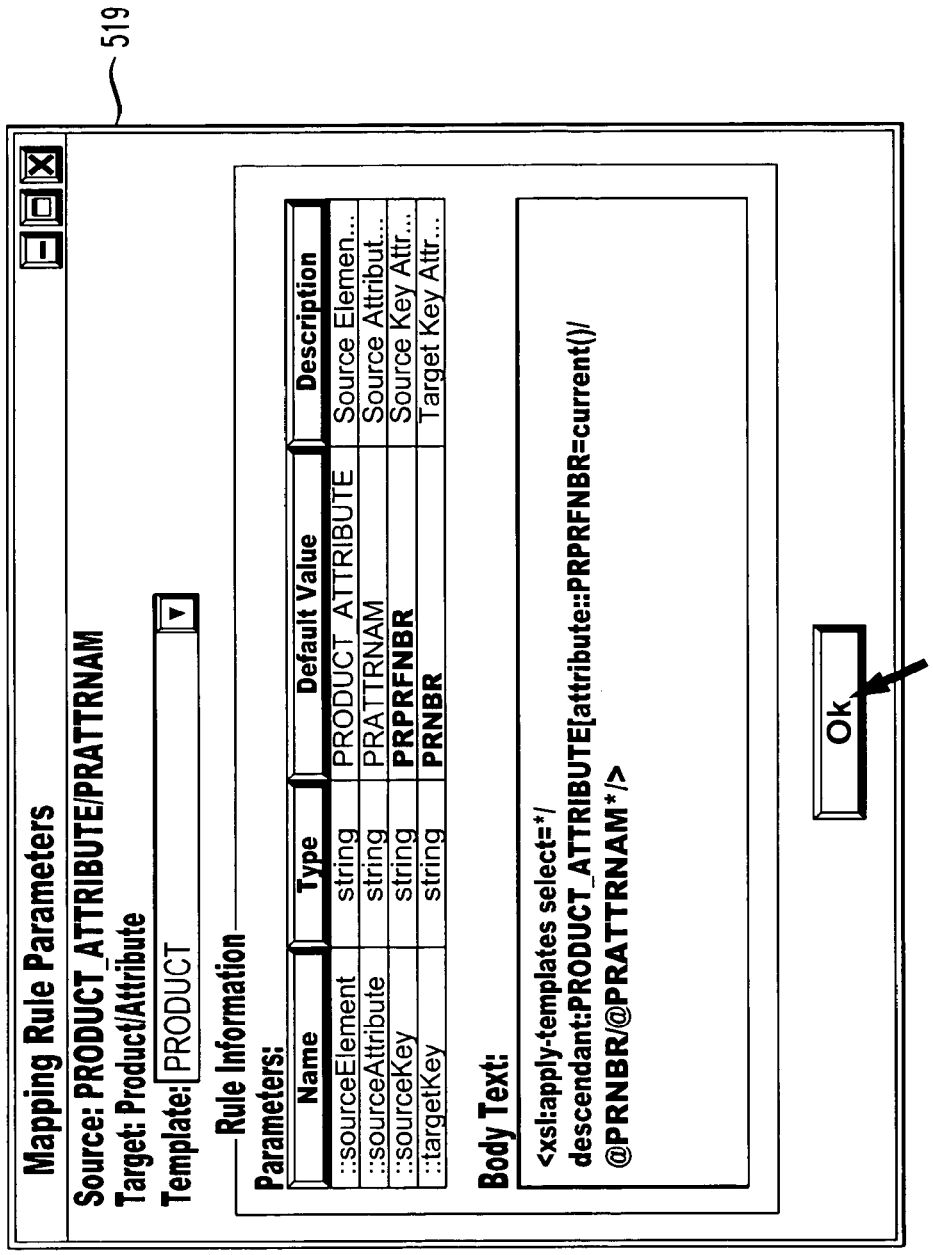
FIG. 5c is a dialog box for adding missing parameters to the screen of FIG. 5b.
Figure 5D:
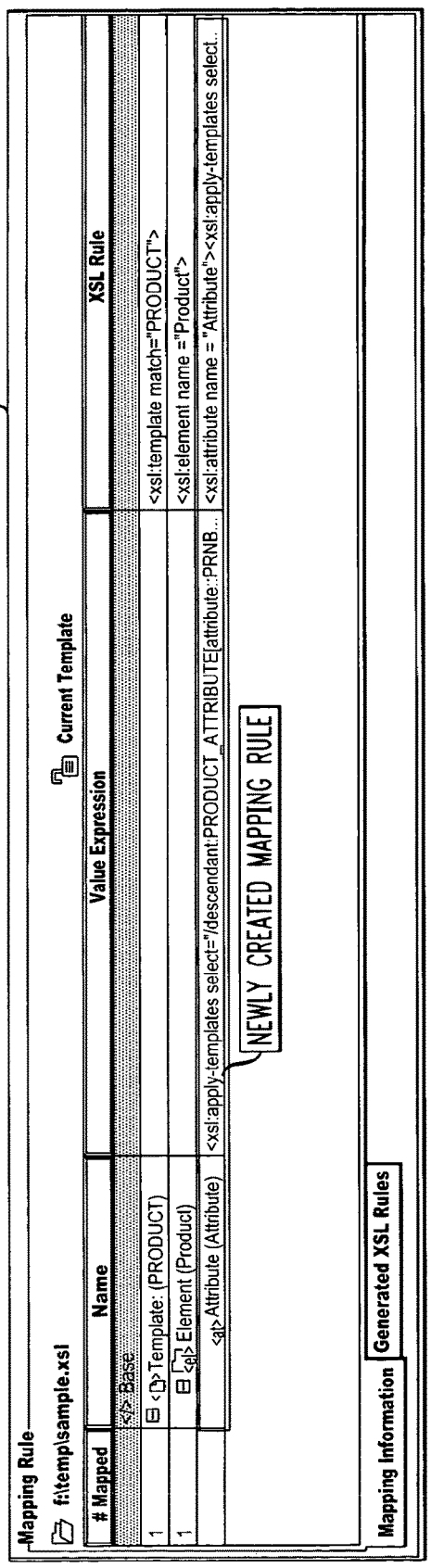
FIG. 5d is a template of a new mapping rule stored in a mapping information table.
Figure 5E:
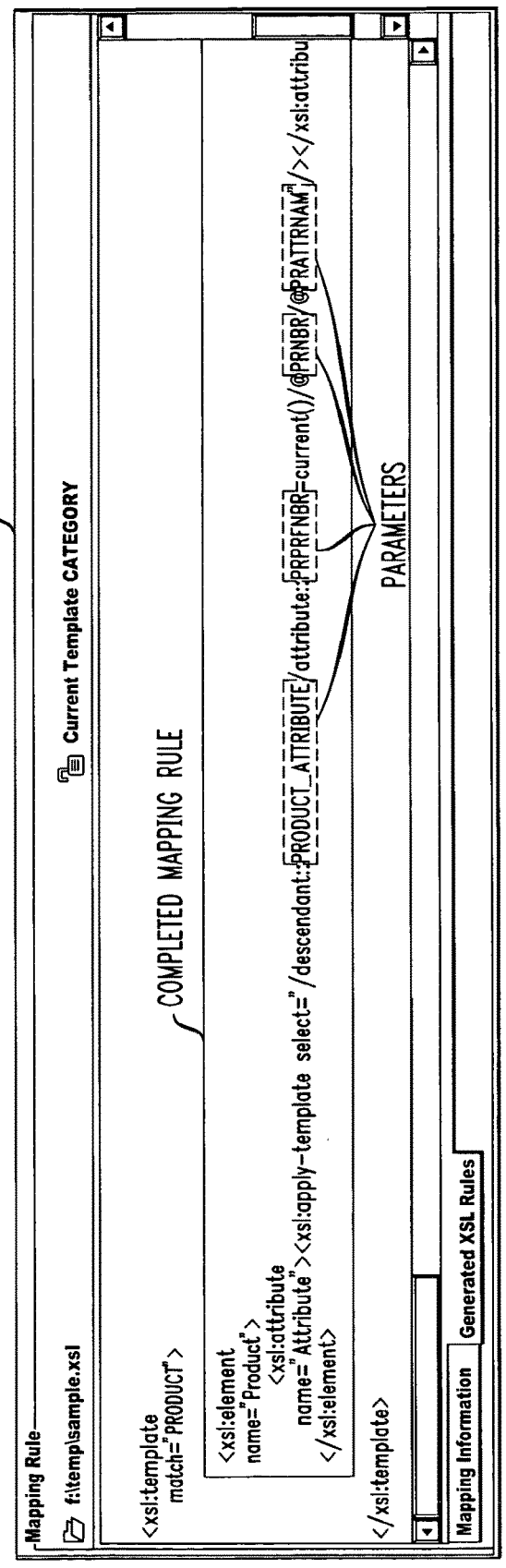
FIG. 5e is a textual representation of the mapping rule of FIG. 5d.

FIG. 5 describes an automatic process 500 for determining parameter values in new meta rules. In step 501, an editor creates a visual transformation mapping rule editor screen 503, which displays the source and target schema meta data. The editor using a pointing device, drags and drops the source (PRODUCT_ATTRIBUTE/PRATTR-NAM) to the target meta data (PRODUCT/ATTRIBUTE) as shown in FIG. 5(a). In step 505, the transformation mapping rule engine is notified of the new rule. In step 507, the transformation mapping rule engine interprets the mapping relation and identifies a meta rule to use. The source/target information is incorporated into the meta rule parameters in step 509. A test 511 is performed to determine whether there is missing parameter information. A "yes" condition initiates step 513 which displays a parameter dialog box 515 in the mapping rule editor screen 503. The editor is prompted to supply the missing parameter values in screen 519 shown in FIG. 5(c). In step 521 010 the new mapping rule is created in a template 523 shown in FIG. 5(d) and displayed in a mapping information table. The mapping rule is saved in a mapping rule data file in step 525. A new XSL rule is generated in step 527 and the XSL rule is saved in an XSL rule file in step 529. In step 531, the new mapping rule displayed in a template 533 is shown in FIG. 5(d). The new XSL rule is displayed in a template 535 shown in FIG. 5(e) and saved in sample ".xsl" file, after which, the process ends. FIG. 5 (1) is a listing of pseudo code for creating the new mapping rule.

Figure 6:
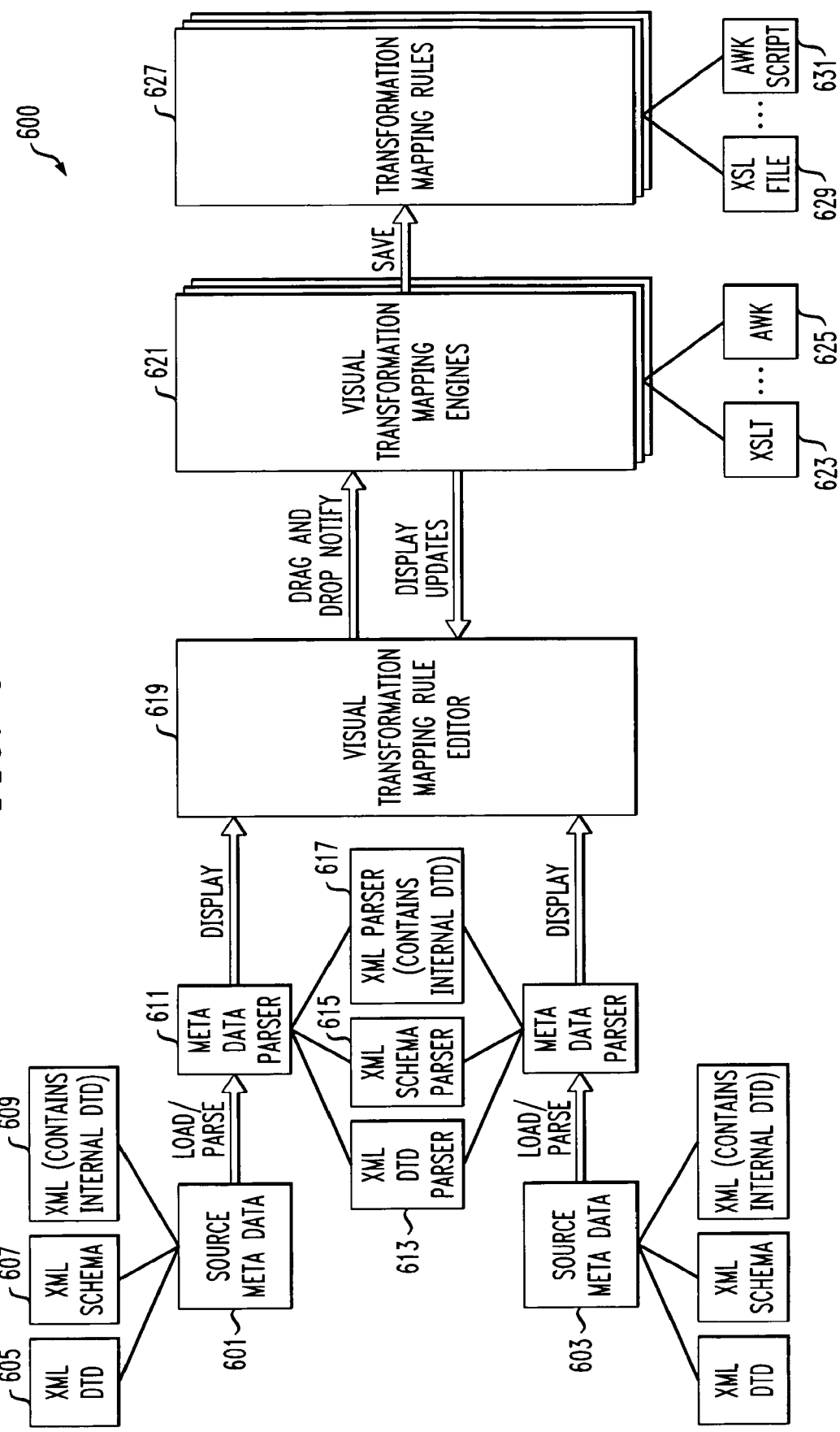
FIG. 6 is a system diagram for creating new meta rules based on different meta data and transformation engines.

In FIG. 6, a system 600 creates transformation mapping rules for different meta data and using different transformation mapping engines. Terminals 601, 603 are each equipped to receive source meta data which may include an XML DTD file 605 or XML schema file 607, or XML containing an internal DTD file 609. The meta data is loaded into a meta data parser 611 using an XML DTD parser 613 or XML schema parser 615 or XML parser containing an internal DTD parser for parsing the data into a form editable by a visual transformation mapping rule editor 619. The editor uses a "drag and drop" process described in FIG. 5 to create the new meta rules in a visual transformation and mapping engine 621. The engine 621 using different transformation engines, for example, Extended Style Logic Transformation (XSLT) 623 or An Interpreted Program Language (AWK) 625 for filtering and manipulating textual data and named after the initials of the creator. The transformation rules are saved in a transformation mapping rule file 627 and either an XSL file 629 or an AWK script file 631.

FIG. 7 is a process 700 which implements the system of FIG. 6 in creating mapping rules using an XSL transformation engine or an AWK transformation engine. In step 701, source meta data is provided to a visual transformation editor which identifies the meta parser and parses the source data in step 703. Simultaneously, target meta data 704 is provided to a transformation-mapping editor, which identifies the meta parser and parses the target data in step 707. In step 709, the source and target meta data are displayed in a visual transformation mapping rule editor screen (see FIG. 4(c)) for automatic generation of a meta rule using a "drag and drop" process on selected source and target meta data in step 711 and as described in conjunction with FIG. 5. The transformation mapping rule engine is notified of the new rule in step 713. When an XSL transformation mapping rule engine is notified in step 715, the mapping relation is interpreted and a new mapping rule is automatically created in step 717. The new XSL transformation mapping rule is stored in an XSL file in step 719 and the visual mapping rule views are updated in step 721. Steps 715', 717', 719' and 721' are performed for the AWK transformation engine in a manner similar to that described for the XSL transformation engine.

In FIG. 8, a system 800 creates a retrieve relation for meta data 801 in either the XML DTD internal form 803 or XML DTD (external form) 805. A DTD parser 807 provides the meta data to a meta data tree-generator 809 which uses pseudo code in FIG. 8(a) to display the meta data in FIG. 9.

FIG. 9 shows a screen 901 displaying meta data in a tree form 903 and in a text form 905. By utilizing the tree view visualization mechanism, the XML DTD elements PARENT-CHILD hierarchy relationships are clearly represented in the tree 903 to the user instead of the flat format in XML DTD file in the textual area 903. The DTD can be a representation for both the internal and external DTD's.

The form of DTD's is a well-understood language within computer systems. The approach to representation for human interaction will now be described in conjunction with FIG. 9. The top level of the tree represents the root element of the XML DTD. In this example, utilizing the XML DTD syntax: WCSV1 ((MERCHANT I CATEGORY I PRODUCT)*) indicates that the children of WCSV1 data elements are MERCHANT, CATEGORY, and PRODUCT. MERCHANT (CATEGORY) defines the child element of WCSV1, (MERCHANT and CATEGORY) indicates that it is a child of MERCHANT. Similarly, CATEGORY (PRODUCT) indicates that the PRODUCT is a child of the CATEGORY. The child-parent relationship is visually represented as specified in the language as a hierarchical tree. This is a pointer-based tree in which all PRODUCT can be reached both via WCS41>MERCHANT→ CATEGORY→ PRODUCT or view via WCSV1>PRODUCT. The underlying elements of PRODUCT in either case are the same since they are represented by the same data structure internally to the computer memory.

The data structures within the memory keep the visual editing view of the tree and the text-based syntax view of the DTD in synchronism. Modification can be made to either visual form and are immediately reflected to the editor in the other form. The DTD (or other representation of the meta data definition) can also be loaded from external file representations.

Figure 10:
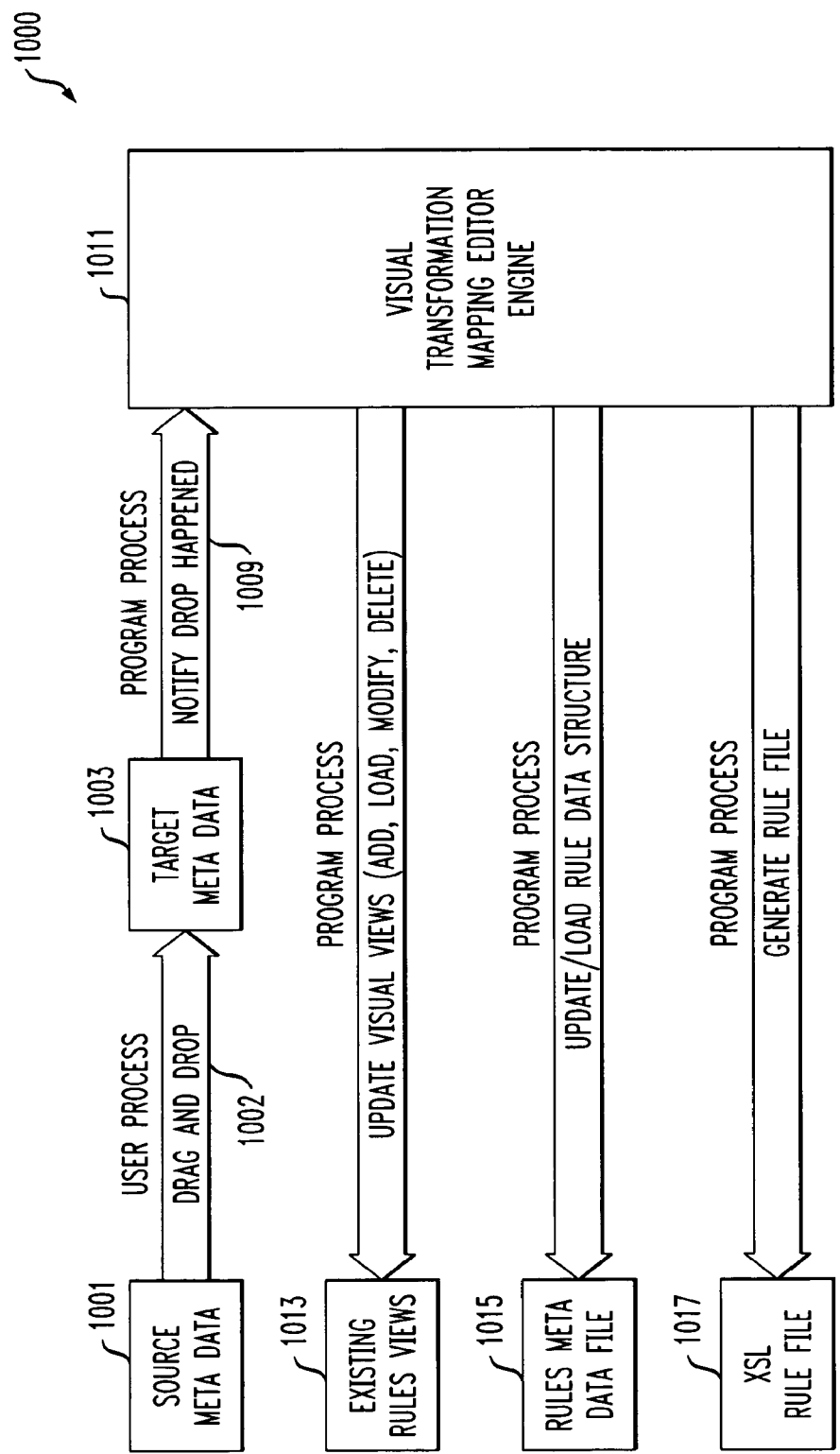
FIG. 10 is a flow diagram for updating a XSL rule file.

FIG. 10 describes a process 1000 for automatically generating XSL rules and automatically saving the rules, which provide the editor with instant feedback on the rule created as well as saving editor steps to obtain the result.

Once the source meta data 1001 and the target meta data 1003 have been loaded into the system, the editor may initiate a "drag and drop" process 1007 between the source and target meta definition trees and generate a notification 1009 to the transformation mapping editor engine 1011 of the creation of a new transformation/mapping rule. The engine 1011 updates the underlying transformation/mapping rules data structure. The engine 1011 updates the visual rules view 1013 that are shown to the editor within the editing environment. The editor 1011 will upload the rule data structure in a rule meta data file 1015 and automatically generate and store the rule in an XSL rule file 1017.

FIG. 10(a) provides pseudo code for implementing the mapping rule change.

Figure 11:
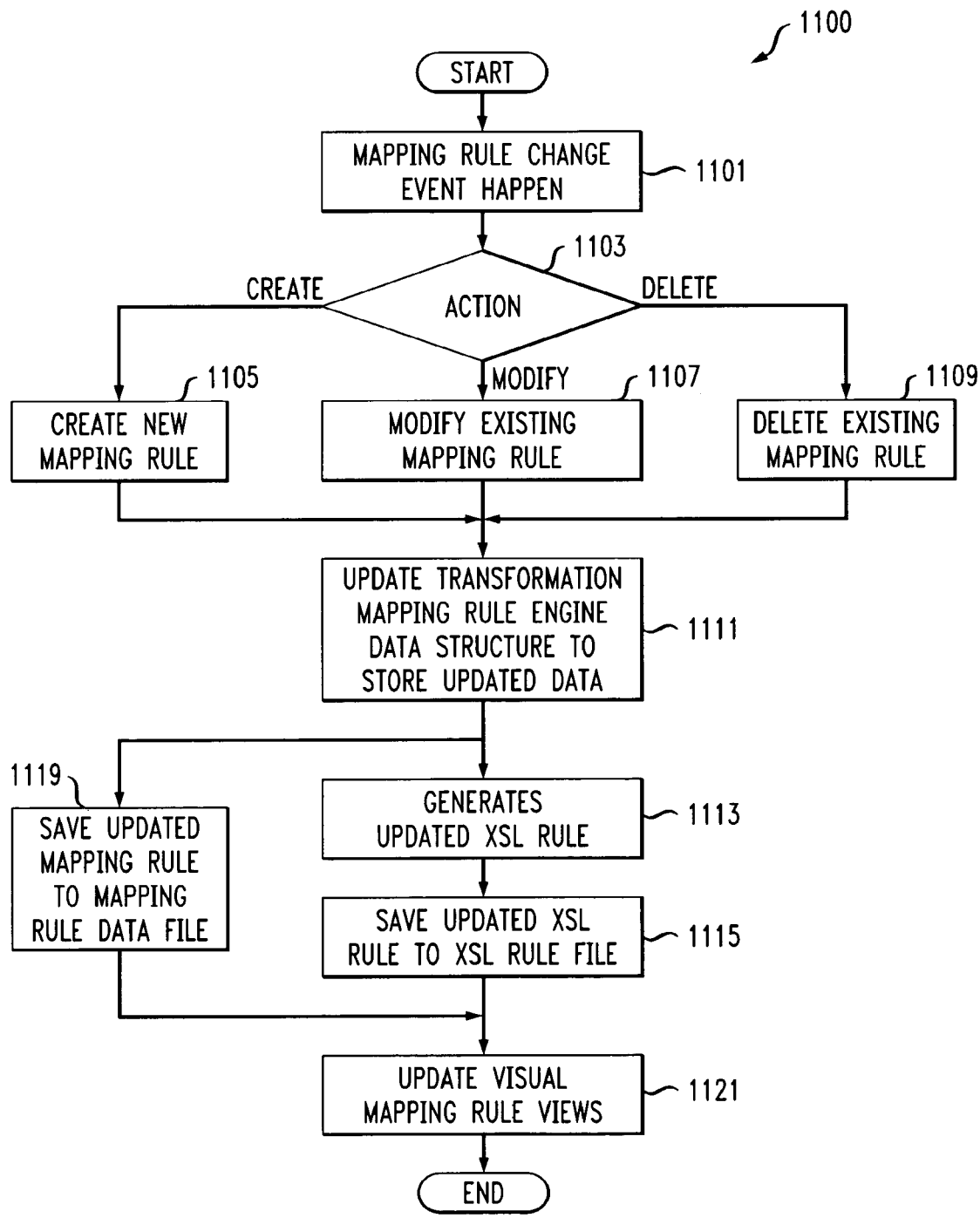
FIG. 11 is a flow diagram for updating visual mapping rule views.

FIG. 11 is a process 1100 which implements the automatic generation of rules and notification described in FIG. 10. In step 1101, a mapping rule change event is detected. A test 1103 is performed to determine whether or not a rule should be created or deleted, or modified. A "create" action generates a new mapping rule in step 1105. A "modify" action modifies an existing mapping rule in step 1107. A "delete" action deletes an existing mapping rule in step 1109. The transformation mapping rule engine data structure is updated in step 1111. An updated XSL rule is automatically generated by the system in step 1113 and saved to an XSL rule file in step 1115. The updated mapping rule is saved to a mapping rule data file in step 1119. The visual mapping rules views file is updated in step 1121 from the mapping rule data file and the XSL rule file.

Figure 12:
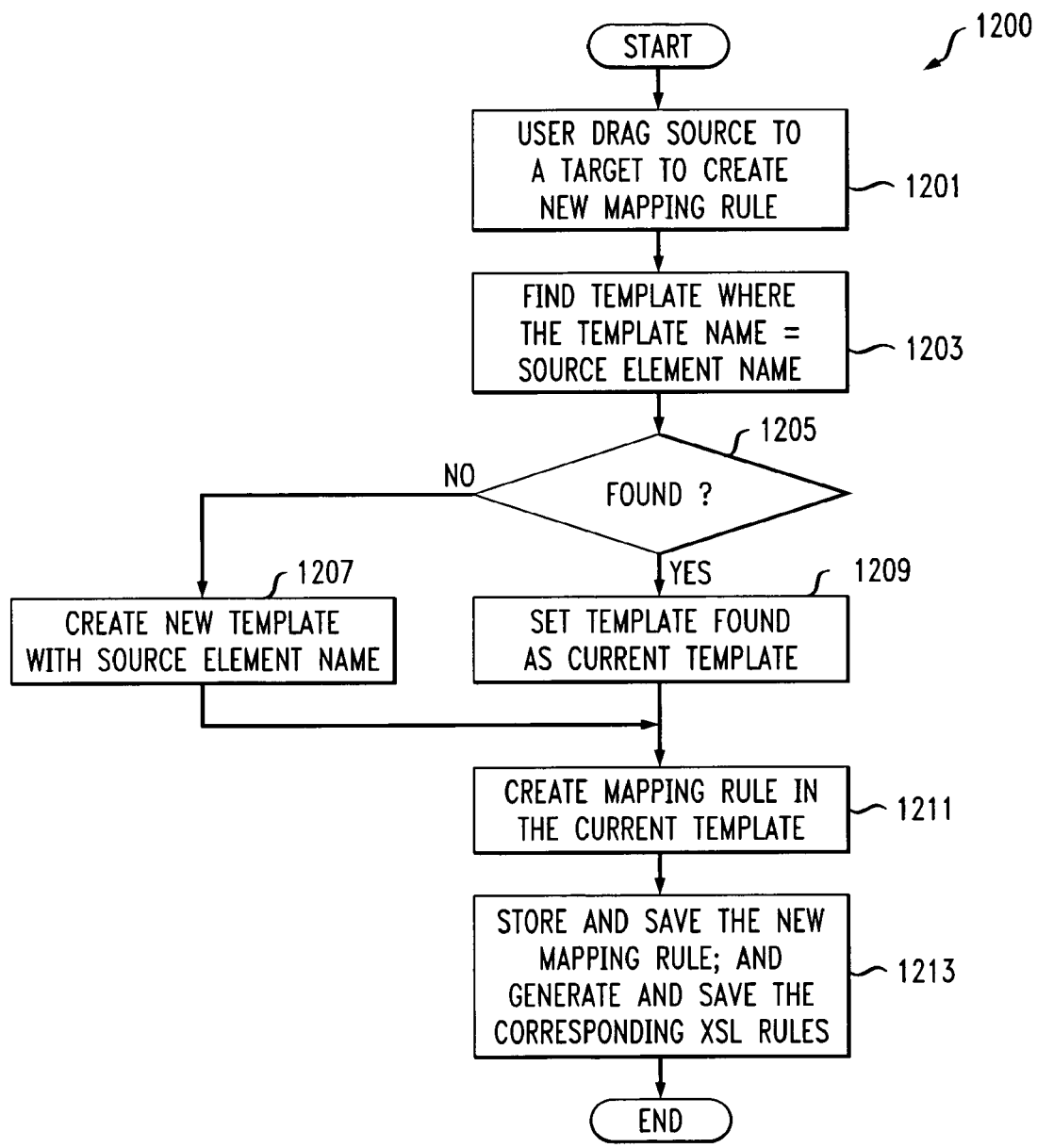
FIG. 12 is a flow diagram for a drag and drop process for creating new meta rules.

FIG. 12 shows a process 1200 for implementing the "drag and drop" process described in conjunction with FIG. 5. In step 1201 the user "drags" the source element to the target to create a new mapping rule. The target elements are searched to find a target template where the target template name equals the source element name in step 1203. A test 1205 is performed to determine if the template has been found. A "no" condition initiates a step 1207 to create a new target template with a source element name. A "yes" condition sets the template found as the current template in step 1209. A new mapping rule is created for the current template in step 1211. The new mapping rule is stored and saved and the XSL rule is generated and saved in step 1213.

By utilizing a locking mechanism in the template it is possible to create a transformation rule to merge data from different elements into a single place through the visual "drag and drop" process. In addition, an editor can focus on building transformation rules on a single element without having to re-pick the source again until the element is unlocked.

Figure 13:
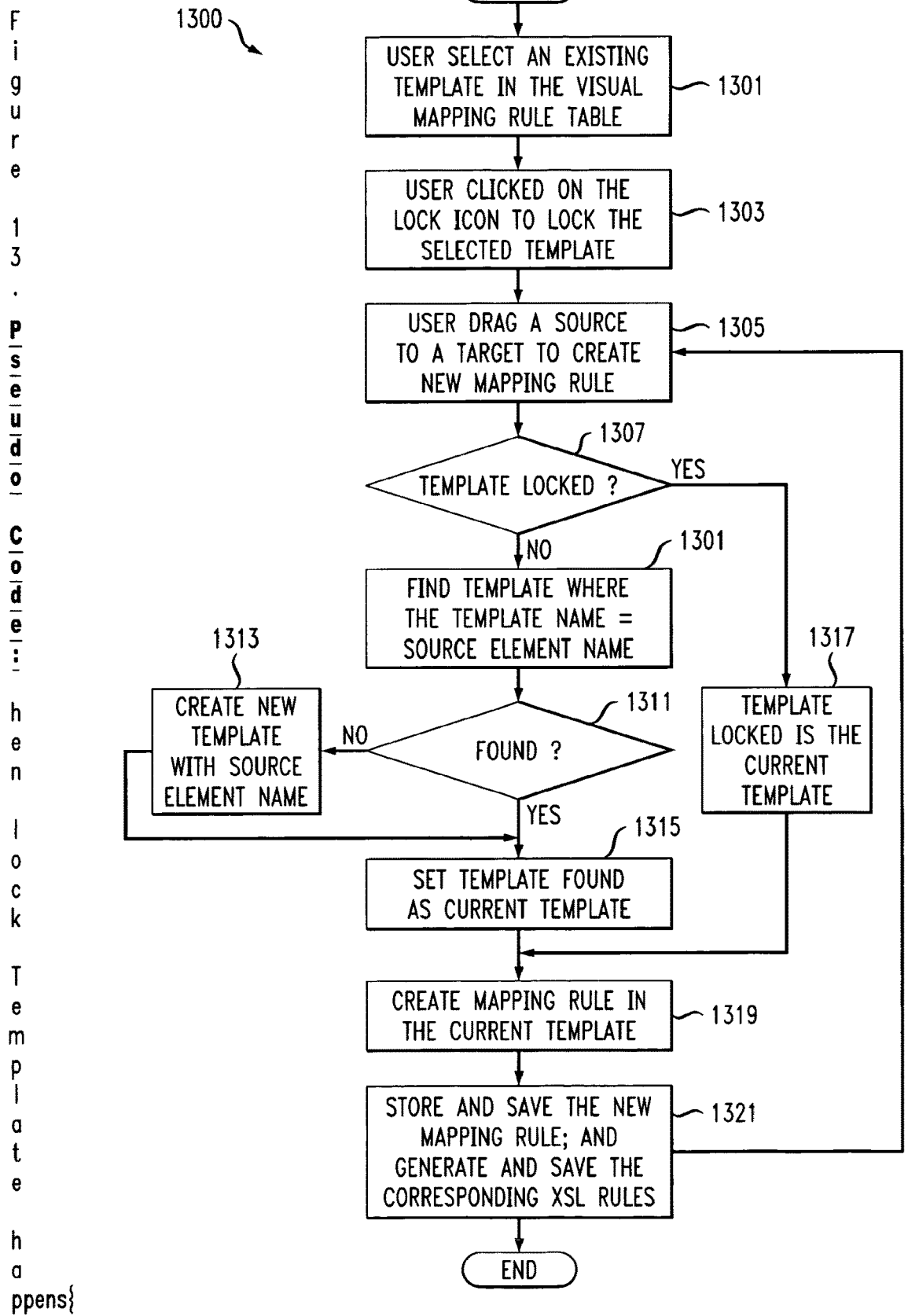
FIG. 13 is a flow diagram for a drag and drop process of FIG. 12 and including a lock template mechanism.

FIG. 13 shows a "drag and drop" process 1300 involving a locked template mechanism, which will be described in conjunction with FIG. 14. In step 1301, an editor selects an existing template 1401 (see FIG. 14) in a visual mapping rule table. The editor "clicks on" a locking icon 1403 (see FIG. 14) to lock the selected template in step 1303. The editor "drags" a source to a target to create a new mapping rule in step 1305. A test 1307 is performed to determine whether the template is "locked." A "no" condition initiates step 1309 to find a template with a template name that equals the source element name. A test 1311 is performed to determine whether the template is found. A "no" condition initiates the step 1313 to create a new template with the source element name. A "yes" condition initiates step 1315, which sets the template found as the "current" template.

Returning to step 1307, a "yes" condition initiates step 1317 to "lock" the template as the "current" template. In step 1319, a mapping rule is created in the current template in response to steps 1315 and 1317. The new mapping rule is stored and saved and a XSL rule is generated and saved in step 1321.

Figure 14:
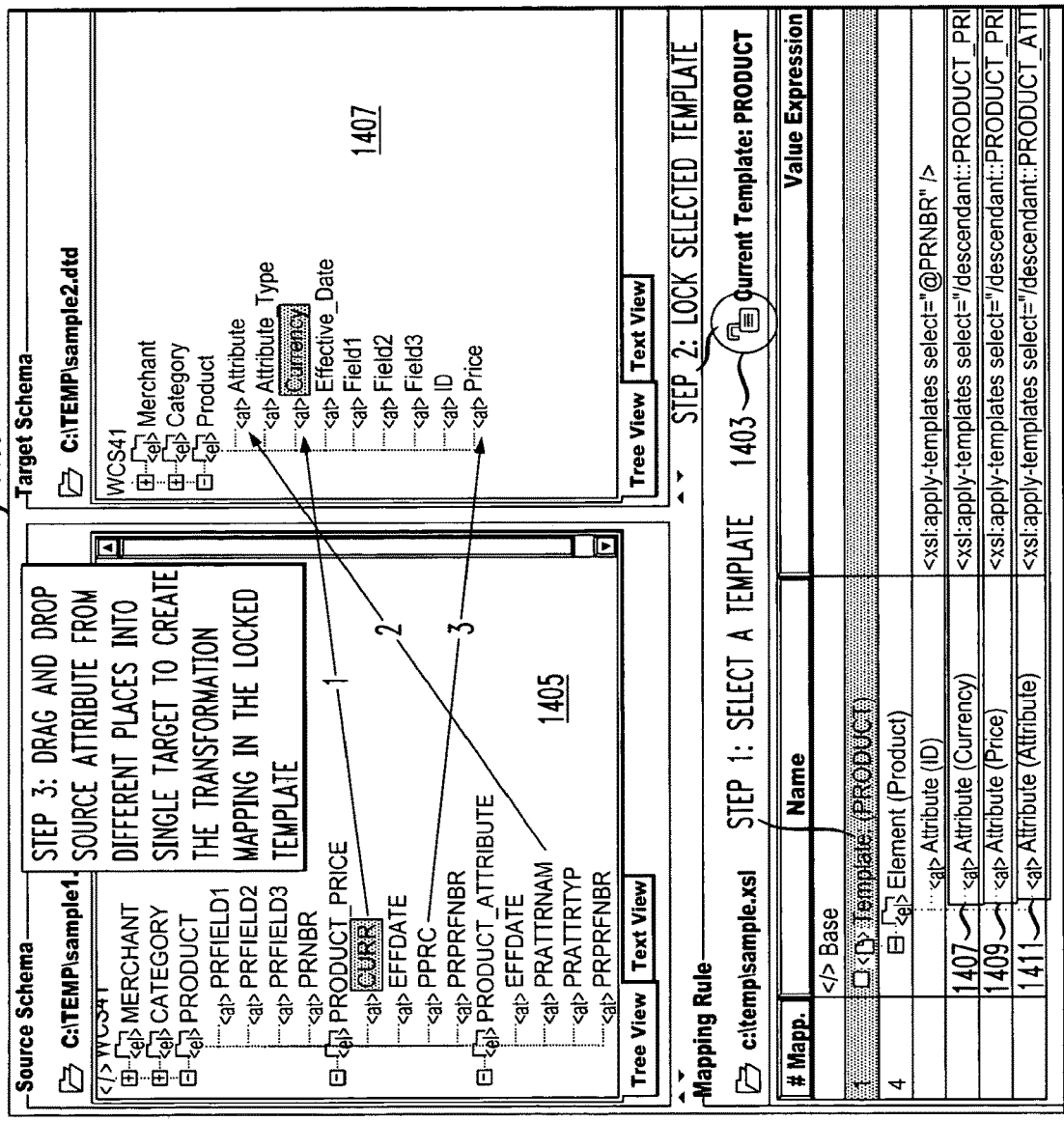
FIG. 14 is a representation of a visual drag and drop process involving a lock template mechanism.

FIG. 14 visually describes a "drag and drop" process involving a "locked" template mechanism. A visual transformation mapping rule editor screen 1400 shows the source schema 1405 and target schema 1407 in the tree fashion. The template 1401 represents a specific source transformation rule set. When the transform process encounters an element of the type PRODUCT, it will process the set of rules that are specified under the Template (PRODUCT) 1401. In order to "lock" down the context of multiple operations within the visual-editing environment to a specific template, the locking mechanism 1403 locks the contents to the template or a portion of the rule definition selected at the time the lock is "clicked." When, the element "CURR" (CURRENCY) attribute from under the PRODUCT PRICE ELEMENT in the source tree to CURRENCY attribute under PRODUCT ELEMENT in the target schema in step 1, a rule 1407 will be created that will be "locked" under the PRODUCT template instead of creating a new template PRODUCT PRICE. This enables "in bound" meta data elements to collapse to one "outbound" data element and the context of all the transformation mapping operations are tied to a single and sample PRODUCT ELEMENT. In step 2, a rule 1409 will be created when PRATTRNAM in the source schema is moved under an attribute of the Target Product as an attribute. In step 3, a rule 1411 is created when PPRC under the source schema is moved under the Price in the target Product element.

Figures 15, 16:
FIG. 15 is a Product-Price template showing the result in a mapping table for regular drag and drop process for a new rule highlighted in the template.
FIG. 16 is a Product template locked when dragging source Product-price/currency to target Product/Currency.

FIG. 15 shows a mapping rule template 1500 in which the regular "drag and drop" process is carried out for dragging source PRODUCT-PRICE/CURRENT to PRODUCT/CURRENCY. A new mapping rule (highlighted) is created under the PRODUCT PRICE template.

In FIG. 16, a mapping rule table 1600 is shown for a "drag and drop" process with a PRODUCT template "locked" when dragging the PRODUCT-PRICE/CURRENT to target PRODUCT/CURRENCY. The new mapping rule (highlighted) is created under the PRODUCT template and not under a PRODUCT PRICE template as shown in FIG. 15.

While the invention has been shown and described in a preferred embodiment, various changes can be made without departing from the spirit and scope of the invention, as defined in the appended claims, in which:

We claim:

1. A computer program product, comprising:
a hardware storage device having stored therein computer usable program code for creating a transformation rule usable to transform an input data file including input data into an output data file including output data,
the computer usable program code, which when executed by a computer hardware system including a visual transformation mapping editor, causes the computer hardware system to perform
receiving, by the visual transformation mapping editor prior to the transformation rule being generated, source meta data including a source data description of a single data field of the input data file;
receiving, by the visual transformation mapping editor prior to the transformation rule being generated, target meta data including a target data description of a single data field of the output data file;
receiving, by the visual transformation mapping editor from a meta rule editor operating on a meta rule configuration file, a meta rule configured to create a transformation rule;
creating, by the visual transformation mapping editor, the transformation rule using the meta rule with the source data description and the target data description; and
storing the transformation rule into a transformation rule file, wherein
the transformation rule file is configured to be used by a transformation engine to generate transformed data,
each data field is to be populated by data having parameters, and
each respective data description characterizes the parameters of the data.

2. The computer program product of claim 1, wherein the computer usable program code further causes the computer hardware system to perform
selecting the meta rule from a plurality of meta rules using a mapping relation between the source data description and the target data description.

3. The computer program product of claim 2, wherein the computer usable program code further causes the computer hardware system to perform
testing the meta rule using the source data description and the target data description to identify missing parameter information.

4. The computer program product of claim 3, wherein the computer usable program code further causes the computer hardware system to perform
upon the missing parameter information being identified, prompting a user to supply the missing parameter information.

5. The computer program product of claim 4, wherein
the transformation rule is created using the tested meta rule and the missing parameter information supplied by the user.

6. The computer program product of claim 1, wherein the computer usable program code further causes the computer hardware system to perform
receiving a second source target data description of a second single data field of the input data file, wherein
the transformation rule is created using both the source target data description and the second source data description.

7. The computer program product of claim 1, wherein the computer usable program code further causes the computer hardware system to perform
simultaneously visually displaying the source data description and the target data description.

8. The computer program product of claim 1, wherein the computer usable program code further causes the computer hardware system to perform
displaying a source schema in tree form; and
displaying a target schema in tree form.

9. The computer program product of claim 1, wherein
the transformation rule is written in XSL (Extended Style Language).

10. The computer program product of claim 1, wherein the computer usable program code further causes the computer hardware system to perform
transforming the input data in the input data file into the output data formatted for the source data file using the transformation rule.

11. A computer hardware system configured to create a transformation rule usable to transform an input data file including input data into an output data file including output data, comprising:
at least one processor including a visual transformation mapping editor, wherein the at least one processor is configured to initiate and/or perform:
receiving, by the visual transformation mapping editor prior to the transformation rule being generated, source meta data including a source data description of a single data field of the input data file;
receiving, by the visual transformation mapping editor prior to the transformation rule being generated, target meta data including a target data description of a single data field of the output data file;
receiving, by the visual transformation mapping editor from a meta rule editor operating on a meta rule configuration file, a meta rule configured to create a transformation rule;
creating, by the visual transformation mapping editor, the transformation rule using the meta rule with the source data description and the target data description; and
storing the transformation rule into a transformation rule file, wherein
the transformation rule file is configured to be used by a transformation engine to generate transformed data,
each data field is to be populated by data having parameters, and
each respective data description characterizes the parameters of the data.

12. The system of claim 11, wherein the at least one processor is further configured to initiate and/or perform
selecting the meta rule from a plurality of meta rules using a mapping relation between the source data description and the target data description.

13. The system of claim 12, wherein the at least one processor is further configured to initiate and/or perform
testing the meta rule using the source data description and the target data description to identify missing parameter information.

14. The system of claim 13, wherein the at least one processor is further configured to initiate and/or perform
upon the missing parameter information being identified, prompting a user to supply the missing parameter information.

15. The system of claim 14, wherein
the transformation rule is created using the tested meta rule and the missing parameter information supplied by the user.

16. The system of claim 11, wherein the at least one processor is further configured to initiate and/or perform
receiving a second source target data description of a second single data field of the input data file, wherein
the transformation rule is created using both the source target data description and the second source data description.

17. The system of claim 11, wherein the at least one processor is further configured to initiate and/or perform
simultaneously visually displaying the source data description and the target data description.

18. The system of claim 11, wherein the at least one processor is further configured to initiate and/or perform
displaying a source schema in tree form; and
displaying a target schema in tree form.

19. The system of claim 11, wherein
the transformation rule is written in XSL (Extended Style Language).

20. The system of claim 11, wherein the at least one processor is further configured to initiate and/or perform
transforming the input data in the input data file into the output data formatted for the source data file using the transformation rule.

* * * * *